United States Patent
Chawda et al.

(10) Patent No.: US 10,922,539 B2
(45) Date of Patent: Feb. 16, 2021

(54) AUTOMATICALLY PROCESSING A STREAM OF TRANSACTION ITEMS BASED ON IMAGE AND CALENDAR INFORMATION

(71) Applicant: Microsoft Technology Licensing, LLC, Redmond, WA (US)

(72) Inventors: Hemanshu Khimraj Chawda, San Francisco, CA (US); Neal Alan Bernstein, Mercer Island, WA (US); Harlan Joy Frost, San Francisco, CA (US); Syed Farhan Raza, Issaquah, WA (US); James Han Wang, San Francisco, CA (US); Nicholas Romano, San Francisco, CA (US); Zeyuan Guan, San Pablo, CA (US); Armani Ronaldo Rosiles, San Francisco, CA (US); Amrita Chowdhury, Santa Clara, CA (US); Chad William Newbry, Berkeley, CA (US); Christopher Yu, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

(21) Appl. No.: 16/377,127

(22) Filed: Apr. 5, 2019

(65) Prior Publication Data
US 2020/0320292 A1   Oct. 8, 2020

(51) Int. Cl.
G06K 9/00   (2006.01)
G06K 9/34   (2006.01)
(Continued)

(52) U.S. Cl.
CPC ..... *G06K 9/00483* (2013.01); *G06K 9/00463* (2013.01); *G06K 9/344* (2013.01); *G06Q 10/1093* (2013.01); *G06Q 20/389* (2013.01)

(58) Field of Classification Search
CPC .............. G06K 9/00483; G06K 9/344; G06K 9/00463; G06Q 20/389; G06Q 10/1093
See application file for complete search history.

(56) References Cited

U.S. PATENT DOCUMENTS 9,721,305 B2   8/2017   Bomze et al.
10,210,581 B2   2/2019   Barrett et al.
(Continued)

OTHER PUBLICATIONS

"Spend: Easy Automatic Expenses," available at <<https://itunes.apple.com/us/app/spend-easy-automatic-expenses/id1433830883?mt=8>>, iTunes page for a software program produced by Microsoft Corporation, Redmond, WA, accessed on Mar. 12, 2019, 4 pages.
(Continued)

*Primary Examiner* — Qian Yang

(57) ABSTRACT

A computer-implemented technique is described for using an automation tool to facilitate the preparation of a summary document, such as an expense report. In a first data path, a receipt-processing component generates receipt items based on images of physical receipts that a user captures using a camera. In a second data path, one or more transaction-processing systems forward transaction items to the automation tool upon their capture; the transaction items correspond to electronic records of transactions made by the user. The technique then generates a set of receipt-transaction (R-T) pairings by matching pairs of receipt items and transaction items that describe the same respective transactions. The technique then uses context information to supplement the R-T pairings, and generates a summary document that summarizes transactions made by the user based on the supplemented R-T pairings. In one case, the context information corresponds to calendar information specified in a user's electronic calendar.

21 Claims, 13 Drawing Sheets

(51) Int. Cl.
*G06Q 10/10* (2012.01)
*G06Q 20/38* (2012.01)

(56) References Cited

U.S. PATENT DOCUMENTS

| | | | |
|---|---|---|---|
| 2005/0182774 A1* | 8/2005 | Weir | G06Q 20/023 |
| 2016/0035042 A1* | 2/2016 | Bomze | G01C 21/3697 |
| | | | 705/30 |
| 2016/0042471 A1* | 2/2016 | Barrett | G06Q 40/02 |
| | | | 705/30 |
| 2019/0318347 A1* | 10/2019 | Aguiar | G06Q 20/22 |

OTHER PUBLICATIONS

Search Report and Written Opinion in PCT/US2020/024349, dated May 19, 2020, 14 pages.

* cited by examiner

Organizer: Joe.Baker@MyCompany.com
Location: Little Italy, Downtown
Subject: Lunch and Baseball!
Start Time: April 3$^{rd}$, 2019, 12:00PM  } 504
End Time: April 3$^{rd}$, 2019: 6:30PM
Attendees: Joe.Baker@MyCompany.com;
Bill.Jones@AcmeCorp.com; Martha.Smith@AcmeCorp.com } 506

Hello Bill and Martha:

Looking forward to seeing you on Wednesday.

. . .

502

Expense Report

Select Start Time: | Filter by: | Select Type(s) of Report(s)    <u>1304</u>
--- | --- | ---
April 1, 2019 | Business ▼ | I    E    L    (more)...
Select End Time: | and | Invoice    Expense    Personal Log
April 15, 2019 | ▼ |

1306            1308            1310

<u>1312</u>

Sales Pitch, Acme Corporation, April 3rd

- Transportation: Uber, From Field Office #2    $23.45
  to 150 Pike Street, Seattle [See Receipt] } 1314
- Lunch at Little Italy, 140 Pike Street Seattle    $72.45
  Attendees: Bill Jones and Martha Smith [See Receipt]
- Coffee at John's Coffee Shop,    $6.15
  145 Pike Street, Seattle [See Receipt]
- Transportation: Yellow Cab, From Pike Street    $20.30
  to Mariner's Stadium [See Receipt]
- Tickets to baseball game at Mariner's Stadium    $157.20
  Attendees: Bill Jones and Martha Smith [See Receipt]
- Transportation: Mariner's Stadium to    $45.90
  Field Office #2 [See Receipt]

Sales Pitch, Freemont Corporatio      ↖ 1302

- Transportation: Uber, From

FIG. 13

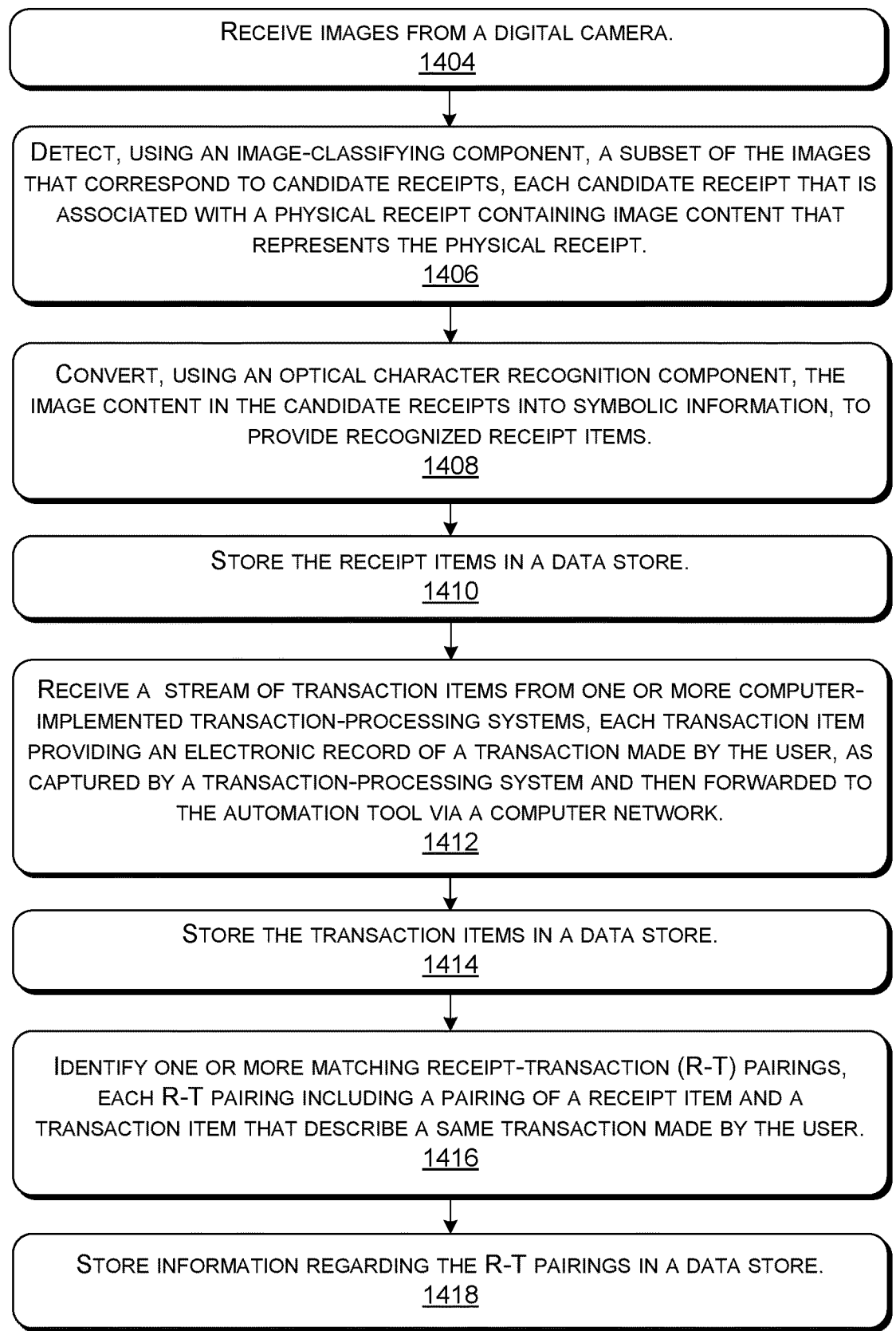

AUTOMATICALLY PROCESSING A STREAM OF TRANSACTION ITEMS BASED ON IMAGE AND CALENDAR INFORMATION

BACKGROUND

Computer-implemented tools exist for handling individual aspects of some bookkeeping operations. In practice, however, these tools operate in a standalone manner and leave a significant amount of manual work for a user to perform. Such work is burdensome to the user and prone to error.

SUMMARY

A computer-implemented technique is described herein for using an automation tool to facilitate the preparation of a summary document, such as an expense report. In a first data path, a receipt-processing component generates receipt items based on images of physical receipts that a user captures using a digital camera. The receipt-processing component performs this task by first classifying a subset of the user's images as candidate receipts and then converting image content in those images into symbolic information using an optical character recognition (OCR) component. In a second data path, one or more computer-implemented transaction-processing systems forward transaction items to the automation tool in real time upon their capture, via a computer network. The transaction items correspond to electronic records of transactions made by the user. The technique then generates a set of receipt-transaction (R-T) pairings by matching pairs of receipt items and transaction items that describe the same respective transactions. The technique next uses context information to supplement the R-T pairings. The technique finally generates a summary document that summarizes transactions made by the user based, at least in part, on the supplemented R-T pairings.

According to one illustrative aspect, the context information corresponds to calendar information specified in a user's electronic calendar, which the automation tool receives via a third data path. Here, the technique operates by identifying one or more matching calendar entries in the user's calendar, each of which has an event time that matches a transaction time of a transaction identified by the automation tool. The technique may then attach a classification label to each R-T pairing associated with a matching calendar entry, e.g., by designating the transaction underlying the R-T pairing as business-related. It may also annotate the R-T pairing associated with a matching calendar entry with attendee information specified in the matching calendar entry.

According to another illustrative aspect, the automation tool presents one or more user interface presentations on a display device. The user interface presentations including at least: one or more user interface presentations that enable the user to register a form of payment with the transaction-processing systems; one or more user interface presentations that enable the user to review and act on proposed R-T pairings; one or more user interface presentations that enable the user to enter instructions regarding unmatched receipt items; and one or more user interface presentations that enable the user to review the summary document.

According to another illustrative aspect, the technique involves: detecting that a receipt item matches a transaction item, to identify a newly-matched R-T pairing; sending an alert to the user that notifies the user of the newly-matched R-T pairing; and providing a graphical prompt to the user, via a user interface presentation, which invites the user to reject (or confirm) the newly-matched R-T pairing.

According to another illustrative aspect, the technique involves: detecting that a receipt item has not been matched with a transaction item within a prescribed amount of time since creation of the receipt item; sending an alert to the user that notifies the user of the unmatched receipt item; and providing a graphical prompt to the user, via a user interface presentation, that invites the user to take an action with respect to the unmatched receipt item.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 13 shows a UI presentation that provides an illustrative expense report.

FIG. 14 is a flowchart that shows a process for matching receipt items with transaction items, to provide proposed R-T pairings.

Figure 1:
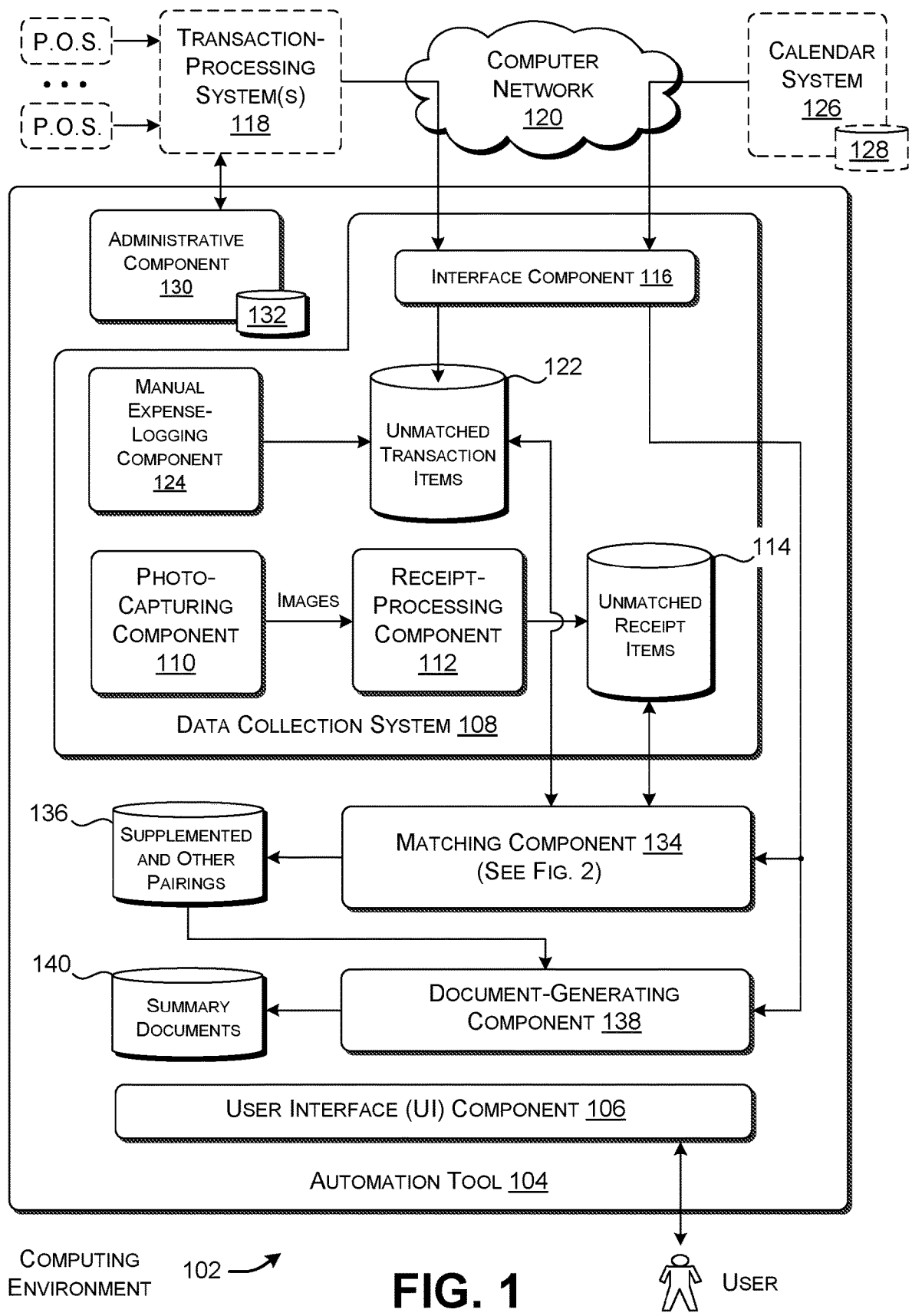
FIG. 1 shows an illustrative computing environment including an automation tool. The automation tool generates documents that summarize transactions made by a user.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment for assisting the user in generating summary documents, such as expense reports. Section B sets forth illustrative methods that explain the operation of the computing environment of Section A. And Section C describes illustrative computing functionality that can be used to implement any aspect of the features described in Sections A and B.

As a preliminary matter, the term "hardware logic circuitry" corresponds to, at least in part, one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. Each of the terms "component" and "engine" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuity of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

A.1. Overview

FIG. 1 shows an illustrative computing environment 102 that includes an automation tool 104. The automation tool 104 generates documents that summarize payment-related transactions made by a user. In one scenario, for instance, the automation tool 104 generates an expense report that itemizes work-related expenses made by the user. The user may submit the expense report to his or her employer, e.g., for the purpose to seeking reimbursement for the user's expenses and/or to otherwise account for the user's expenses. Or the user may use the expense report to assist him or her in preparing tax documents for submission to the government. In another scenario, the automation tool 104 generates an expense report that itemizes different types of personal expenses made by the user. The user may use such an expense report to help manage his or her personal budget. These use case scenarios are mentioned here in the spirit of illustration, not limitation; still other applications of the automation tool 104 are possible.

FIG. 1 shows a logical view of the automation tool 104. While FIG. 1 illustrates the automation tool 104 as a single monolithic system, the functionality of the automation tool 104 can be distributed between server-side computing resources and local computing resources in various ways. This point is clarified below in the explanation of FIG. 3. Further note that FIG. 1 shows a user interface (UI) component 106 by which a user may interact with the automation tool 104 via different UI presentations (which are described below in Subsection A.2). While FIG. 1 shows a single monolithic UI component 106, in another implementation, the functionality associated with the UI component 106 can be distributed among different functional components of the automation tool 104.

Finally note that the automation tool 104 provides service to a plurality of users. In that scenario, the automation tool 104 permits a user to receive and interact with only his or her own transaction information. In another scenario, the automation tool 104 allows an appropriately-authorized individual (such as a manager) to receive and interact with transaction information associated with a group of people (such as the subordinates who work for the manager). To facilitate explanation, however, the automation tool 104 will be described below with respect to the service it provides to a single user.

The automation tool 104 includes a data collection system 108 for receiving plural kinds of input information. In a first data path, a photo-capturing component 110 receives images that a user takes using a digital camera, such as a digital camera provided by a smartphone. For each image, a receipt-processing component 112 then uses image classification technology to determine whether the image corresponds to a candidate receipt. If so, the receipt-processing component 112 then uses optical character recognition (OCR) technology to convert image content in the candidate receipt into symbolic (e.g., alphanumeric) information, to thus form what is referred to herein as a receipt item. The receipt-processing component 112 then stores the receipt item in a data store 114. Additional information regarding the operation of the receipt-processing component 112 is provided below in the context of the explanation of FIG. 2.

In another input path, an interface component 116 receives transaction items from one or more transaction-processing systems 118 via a computer network 120. As used herein, a transaction-processing system corresponds to a computing system provided by any entity that allows a user to pay for goods and services, and which provides real-time accounting of these payments. Without limitation, the entities associated with the transaction-processing systems 118 encompass card processing companies (such as VISA, MASTER CARD, AMERCIAN EXPRESS, etc.), banks, credit unions, funds transfer companies, etc. To facilitate explanation, however, this Detailed Description will emphasize the first-mentioned scenario, in which the transaction-processing systems 118 correspond to one or more card processing networks. The automation tool 104 is said to receive transaction items in real time because the transaction-processing systems 118 forward the transaction items to the automation tool 104 as soon as they capture them.

In a typical card processing network, a user pays for some good or service by presenting a physical card at a point of sale (P.O.S), or by otherwise specifying an account number associated with a form of payment at the point of sale. In some cases, the point of sale may be located at a physical establishment, such as a store or restaurant. In other cases, the point of sale may correspond to a payment portal provided by a website. A transaction-processing system either authorizes or denies the purchase by applying environment-specific authorization logic. A few days later, the transaction processing system settles the transaction. Settlement involves finalizing the transaction and sending payment to the entity that provided the good or service to the user. In a credit-based arrangement, a transaction-processing system then seeks reimbursement from the user for his or her purchases, e.g., on a monthly basis. In a debit-based arrangement, a transaction-processing system directly debits a user's account to pay for the purchases.

In the above representative context, the interface component 116 can receive transaction items that describe authorization events logged by the transaction-processing systems 118. Each transaction item for an authorization event may contain various metadata elements, such as: a) an ID associated with the purchase; b) the date and time of the purchase; c) the identity of the person who made the purchase; d) the account number associated with the form of payment; e) the name of the entity that provided the good or service; f) the location of the entity; g) the amount of the purchase; h) a description of the good or service associated with the purchase, etc. In addition, or alternatively, the interface component 116 can receive transaction items that describe settlement events logged by the transaction-processing systems 118. Each transaction item for a settlement event may include the same metadata as the transaction item for its counterpart authorization event, and typically includes the same ID as the transaction item for the counterpart authorization event. However, the transaction item for a settlement event may contain a different payment amount than the transaction item for the counterpart authorization event. For example, the transaction item for a settlement event may include a tip amount added by a user to a restaurant bill that was not specified in the transaction item associated with the counterpart authorization event.

In one implementation, the interface component 116 receives transaction items from the transaction-processing systems 118 via application programming interfaces (APIs) hosted by the transaction-processing systems 118. The transaction-processing systems 118 encrypt all transaction items at rest (in storage) and in transit. The computer network 120 can correspond to a wide area network (e.g., the Internet), a local area network, one or more point-to-point links, etc., or any combination thereof. The interface component 116 stores all received transaction items in a data store 122. The automation tool 104 can also encrypt all transaction items at rest and in transit.

In addition, a user can manually create or edit a transaction item using a manual expense-logging component 124. For example, assume that user makes a purchase using cash payment. The user may interact with the manual expense-logging component 124 to create a transaction item for this purchase, e.g., by manually keying in the purchase amount and merchant associated with this transaction. Alternatively, or in addition, the user may use the manual expense-logging component 124 to create a transaction item for the purchase based on information extracted from the physical receipt associated with this transaction by the receipt-processing component 112.

In still another input path, an interface component 116 receives calendar information from a calendar system 126. The calendar system 126 maintains calendar data for one or more users in a data store 128. In one implementation, the calendar system 126 corresponds to a cloud-implemented calendar service.

A user's calendar identifies calendar events that a user is scheduled to attend or tasks that a user is scheduled to perform. In some use case scenarios, each calendar event may specify various items of calendar information, including: a) a person who organized the event; b) the time of the event (including its duration); c) the location of the event; d) the attendees of the event (referred to herein as "attendee information"); e) a subject of the event; and f) any supplemental content associated with the event (such as a message thread, documents, images, etc.). In one case, a user may maintain a single calendar that contains entries for both personal and business-related events. In another case, a user may maintain separate calendars for personal and business-related events, respectively. Like the transaction-processing systems 118, the calendar system 126 can encrypt its calendar information both at rest and in transit. The automation tool 104 can do likewise.

The calendar information represents just one source of context information that the automation tool 104 uses to interpret transactions made by the user. As will be described in greater detail below, the automation tool 104 can receive other kinds of context information from other respective sources.

An administrative component 130 performs various setup and configuration functions. For example, the user may interact with the administrative component 130 (via the UI component 106) to specify an account number associated with a credit card or other form of payment. The administrative component 130 then interacts with a corresponding transaction-processing system to register the user's account number with the transaction-processing system. This registration operation authorizes the transaction-processing system to subsequently forward transaction items to the automation tool 104 in real time. To invoke this registration operation, the transaction-processing system can use appropriate security mechanisms, such as two-factor authentication. The user may also interact with the administrative component 130 (via the UI component 106) to customize the operation of the automation tool 104 for the user. For example, the user may interact with the administrative component 130 to control the kinds of notifications that the automation tool 104 provides to the user. The administrative component 130 stores all of its configuration settings in a data store 132.

A matching component 134 performs two tasks. In one non-limiting implementation, it first attempts to match unmatched receipt items (in the data store 114) with unmatched transaction items (in the data store 122). That is, for each receipt item, the matching component 134 attempts to find a transaction item that describes the same transaction. If a match if found, the matching component 134 binds the receipt item and the transaction item together to form a receipt-transaction (R-T) pairing. Each R-T pairing is also linked to the image of the physical receipt associated with the receipt item of the R-T pairing. A user may interact with the matching component 134 (via the UI component 106) to confirm (or reject) R-T pairings, edit R-T pairings, delete unmatched receipt items and transaction items, etc.

In the second task, the matching component 134 uses context information to supplement the R-T pairings. For example, the matching component 134 can determine whether a transaction identified by the automation tool 106 occurs at a same time as a calendar event in the user's calendar. If so, this calendar entry constitutes a matching calendar entry according to the terminology used herein. The matching component 134 can then attach an appropriate classification label to each R-T pairing associated with a transaction that matches a calendar entry, e.g., by identifying that R-T pairing as being associated with a business expense. In addition, or alternatively, the matching component 134 can supplement each R-T pairing associated with a transaction that matches a calendar entry with information extracted from the calendar entry. For example, the matching component 134 can annotate the R-T pairing with attendee information that describes the people who attended the matching calendar event. This information conveys that a purchase was made in the company of these people.

The matching component 134 stores the results of its analysis in a data store 136. Those results can include supplemented R-T pairings. The results can also include other R-T pairings that have not been matched with calendar entries, which may be referred to as standalone or unmatched R-T pairings. Each R-T pairing is also linked to an image associated with its receipt item.

A document-generating component 138 generates one or more kinds of summary documents based on the output results provided in the data store 136. For example, the document-generating component 138 can create an expense report based on business expenses made by the user. That expense report can incorporate information gleaned from the user's calendar. The document-generating component 138 can generate a summary document in any specified form (such as a PDF document, a spreadsheet document, etc.). In addition, or alternatively, the document-generating component 138 can create a record for consumption by any downstream expense-processing system; in that case, the document-generating component 138 generates a record in the format expected by the downstream expense-processing system. The document-generating component 138 stores summary documents in a data store 140.

Figure 2:
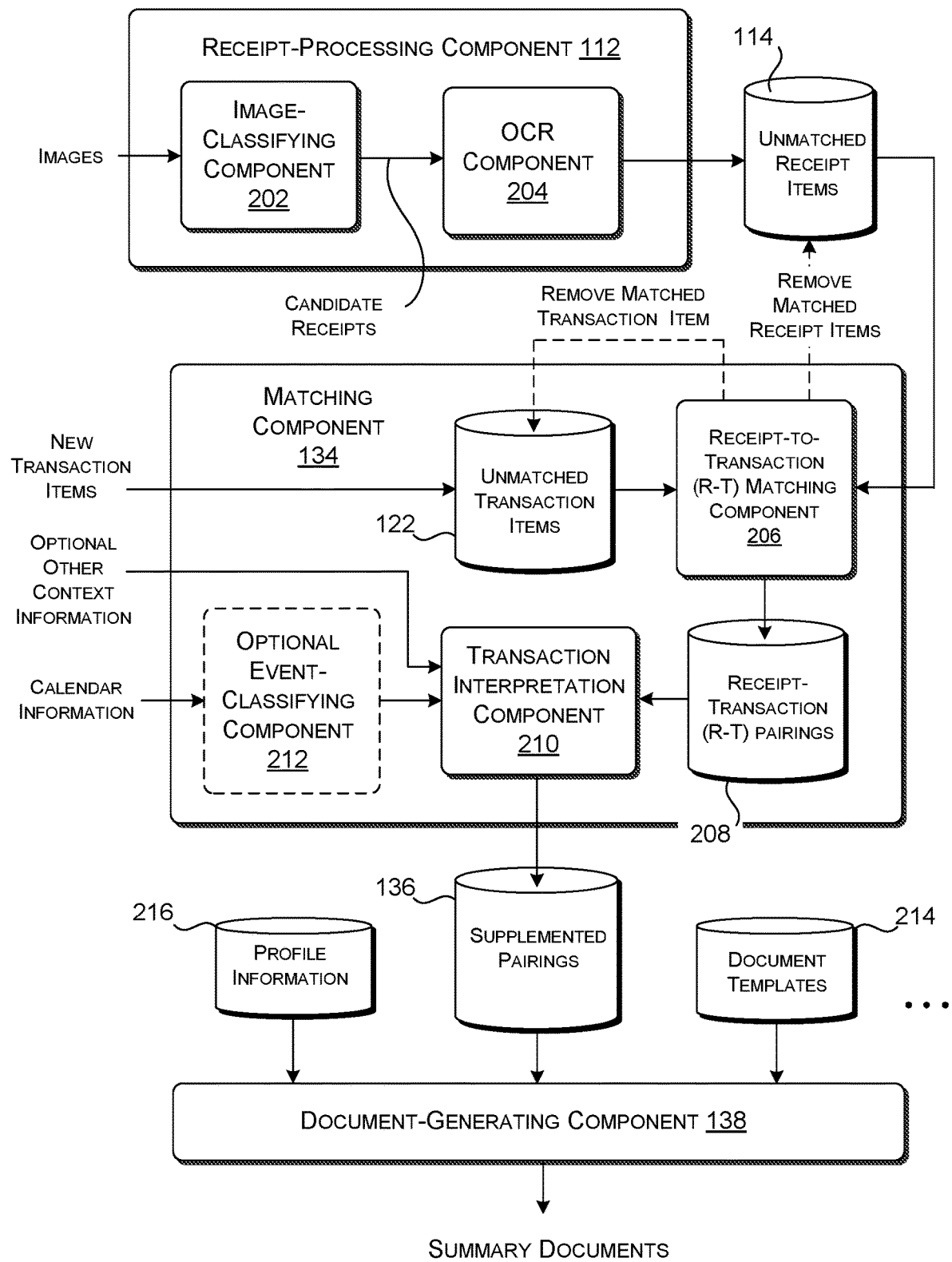
FIG. 2 shows illustrative details of individual components of the automation tool of FIG. 1.

FIG. 2 shows illustrative details regarding individual components of the automation tool 104 of FIG. 1. In the first above-described data path, a user uses a digital camera to take a digital photograph (an "image") of a physical receipt. More specifically, some users may prefer to take the digital photograph a short time after being given the physical receipt at a point of sale. Other users may accumulate physical receipts and then consecutively take digital photographs of them at some later time, such as at the end of a workweek, or at the end of a month, etc.

In operation, a receipt-detecting component 202 first determines whether a digital photograph contains image content that is indicative of a receipt. In one implementation, the receipt-detecting component 202 can perform this task by using a gradient operator to detect transition points of high contrast in the image, where an instance of high contrast constitutes a difference in pixel intensity (between two neighboring pixels) above a prescribed threshold value. It then identifies linear edges formed by neighboring transition points of high contrast. The image-classifying component 202 can conclude that an image contains a receipt when it contains a prescribed number of orthogonal linear edges, each longer than a prescribed length. In another implementation, the image-classifying component 202 uses a machine-trained model to determine whether an image contains image content indicative of a receipt. For example, the image-classifying component 202 can use a deep neural network (DNN) (such as a convolutional neural network (CNN)) followed by a binary classifier to perform this task. An image that is determined to include image content indicative of a receipt is referred to herein as a candidate receipt.

An OCR component 204 uses optical character recognition to convert each candidate receipt into symbolic (e.g., alphanumeric) information. The OCR component 204 can use different techniques to perform this task, such as a pattern-matching technique, a machine-trained model (e.g., a neural network), etc. This operation yields a receipt item, according to the terminology used herein. More specifically, the receipt item may include symbolic information that represents whatever information is printed on the physical receipt. In a typical case, a receipt item may include: a) the name of the entity that provided a good or service to the user; b) the address of the entity; c) the date and time of the purchase; d) the amount of the purchase; e) a description of the good or service associated with the purchase; and f) a partially-anonymized account number (e.g., containing only the last four numbers of a user's credit card number), etc. In some cases, the receipt may also include handwritten information, such as a tip amount, a total payment amount (including the tip amount), the user's signature, etc. The OCR component 204 also makes an attempt to convert handwritten information into alphanumeric information. But the metadata associated with handwritten information can be expected to be less reliable than the metadata associated with machine-printed information. In one implementation, the matching component 134 ignores any instance of metadata having a confidence level below a prescribed environment-specific threshold value. This means that, in some scenarios, the matching component 134 will use a machine-printed purchase amount listed on the physical receipt, rather than a handwritten purchase amount. Hence, in some cases, the matching component 134 may be unsuccessful in capturing the tip amount that a user manually writes on a physical receipt.

Finally, the receipt-processing component 112 stores each receipt item that it captures in a data store 114. A receipt item that has not yet been paired with a transaction item is referred to herein as an unmatched receipt item. Another data store 122 stores transaction items that the automation tool 104 receives from the transaction-processing systems 118. These transaction items constitute unmatched transaction items when first received because they have not yet been matched to associated receipt items.

Now referring to the matching component 134, a receipt-to-transaction matching ("R-T matching") component 206 performs the task of matching receipt items with transaction items, to produce receipt-transaction (R-T) pairings. In one implementation, the R-T matching component 206 can compare a given receipt item with a given transaction item by determining whether they agree with respect to one or more of: a) purchase time and date; b) purchase amount; and c) merchant name. As a preliminary comment, note that the R-T matching component 206 can rely on descriptive tag information in each transaction item to interpret the information imparted by the transaction item, enabling it to definitively extract the purchase time and date, purchase amount, and merchant name associated with the transaction item. The R-T matching component 206 can determine the presence of time and date information in receipt items based on telltale alphanumeric data indicative of temporal information, e.g., "AM," "PM," "n:n" (where n is any number), "January," "February," "n/n/n" (where n is any number), etc. The R-T matching component 206 can determine the presence of purchase amount information in receipt items based on the presence of telltale alphanumeric data indicative of monetary information, e.g., "total," "$," etc. The R-T matching component 206 can determine the presence of entity name information in receipt items in various ways, such as by comparing strings in the receipt items with known entity names specified in a lookup table. Or the R-T matching component 206 can consider any string that is not date/time information, location information, purchase amount information, etc. as de facto candidate name information. The R-T matching component 206 can apply the same analysis to transaction items in those cases in which tag information in the transaction items does not unambiguously label their constituent parts.

In one implementation, the R-T matching component 206 can consider information associated with a transaction item as more definitive than information extracted from a counterpart receipt item. For example, the R-T matching component 206 can consider timestamp information identified in a transaction item as the definitive date and time on which a transaction has occurred.

The R-T matching component 206 can apply different degrees of tolerance in matching different items of metadata. For example, the R-T matching component 206 can determine that the time/date information in a receipt item matches the time/date information of a transaction item if they differ by no more than a time span of k hours (e.g., 24 hours). This relaxation factor helps account for those situations in which the timestamp of a transaction item may differ from the time information on a receipt item due to time zone issues or the like. The R-T matching component 206 can determine that the purchase amount in a receipt item matches the purchase amount of a transaction item if they differ by no more than p percent (e.g., 20 percent). This relaxation factor will account for those cases in which the OCR component 204 fails to accurately detect a total amount that a user may have written on a receipt by hand. The R-T matching component 206 can determine that a merchant name in a receipt item matches name information in a transaction item if these two strings differ by no more than a prescribed edit distance. In another case, the R-T matching component 206 can consult a lookup table to map each instance of name information that it finds in a receipt item or a transaction item to canonical information associated with that name. The R-T matching component 206 can then perform matching based on the canonical counterparts of name information specified in the receipt item and the transaction item under consideration. Further note that, in those cases in which a merchant name includes two or more component parts (such as "NEIMAN MARCUS"), the R-T matching component 206 can perform matching on the name as a whole and with respect to each of its individual parts. Finally, the R-T matching component 206 can optionally ignore certain common name parts when it matches names, such as "Company," "Inc.," etc.

In one implementation, the R-T matching component 206 determines that a receipt item matches a transaction item if all three above the above tests return an affirmative match result. In another implementation, the R-T matching component 206 determines that a receipt item potentially matches a transaction item if only the first two tests (purchase date/time and purchase amount) return an affirmative result. Different implementations can also apply different matching rules when comparing two instances of name information. For example, in one implementation, the R-T matching component 206 can compare two instances of name information in their respective multipart entireties; it can determine that these two instances of name information agree only if they differ by no more than a prescribed edit distance. In another implementation, the R-T matching component 206 can determine that two instances of name information match if there is agreement with respect to just one string associated with the multipart name information. The R-T matching component 206 can also assign a confidence score to each candidate R-T pairing based on any environment-specific measure of the extent of agreement between its associated receipt item and transaction item.

The R-T matching component 206 can also dynamically adjust the confidence score based on the length of time since a transaction is assumed to have been made. For example, assume that a receipt item under consideration includes printed time information, identifying when the purchase occurred. All other factors being equal, the R-T matching component 206 will assign a higher level of confidence to a match that occurs on day 5 after this purchase time, compared to a match that occurs on day 1 after this purchase time. The earlier match (on day 1) is appropriately discounted because there is a chance that a better-matching transaction item will be subsequently received. At day 5, however, the R-T matching component 206 can be assured that it has received all relevant transaction items that may pertain to the receipt item under consideration.

The R-T matching component 206 stores information in a data store 208 that represents each matching R-T pairing. For example, the R-T matching component 206 can store all of the metadata scraped from the matching receipt item and the transaction item in the data store 208. The R-T matching component 206 can also preserve a link between each R-T pairing and the original image associated with its receipt item. In addition, the R-T matching component 206 can mark each receipt item in the data store 114 associated with a R-T pairing as having been successfully matched. This designation removes this receipt item from consideration in future matching operations. Similarly, the R-T matching component 206 can mark each transaction item in the data store 122 associated with an R-T pairing as having been successfully matched. This designation again removes the transaction item from consideration in future matching operations. But a user may subsequently reject a proposed R-T pairing, upon which the R-T matching component 206 can return the receipt item and the transaction item associated with that R-T pairing to the pool of unmatched receipt items and transaction items, respectively.

Finally, the R-T matching component 206 can perform various kinds of transaction reconciliation to account for the arrival of transaction items that describe the same transaction. For example, assume that the R-T matching component 206 component receives a transaction item associated with a settlement event. The R-T matching component 206 can find the counterpart transaction item associated with this purchase's authorization event, and merge these two transaction items together. The R-T matching component 206 can conclude that two transaction items describe the same transaction if they contain the same transaction ID, and/or if they contain the same metadata (with some environment-specific degree of tolerance). The R-T matching component 206 can also take the timestamp associated with two transaction items into account in determining whether they correspond to the same underlying transaction. Two transaction items are unlikely to pertain to the same transaction if they are separated by more than a prescribed number of days.

Likewise, assume that a user takes two or more pictures of the same physical receipt. The R-T matching component 206 can consolidate the two resultant receipt items after concluding that these two receipt items contain the same metadata (with some environment-specific degree of tolerance). For this reason, any individual R-T pairing in the data store 208 may include metadata extracted from one or more receipt items and/or and one or more transaction items.

A transaction interpretation component 210 interprets each R-T pairing in the data store 208 with the aid of one or more instances of context information, to produce supplemented pairings. Consider the case of calendar information, which corresponds to one kind of context information. Assume that a user maintains separate business and personal calendars. The transaction interpretation component 210 determines whether a transaction time associated with each transaction item received by the automation tool 104 coincides with an event time of a calendar entry in the user's business calendar. For example, the transaction interpretation component 210 determines whether the transaction time of a transaction item occurs within a span of time associated with a scheduled event, with respect to any environment-specific degree of tolerance (such as 30 minutes). If so, the transaction interpretation component 210 considers the calendar entry that matches a transaction item as a matching calendar entry, according to the terminology used herein. A subset of R-T pairings in the data store 208 may have transaction items that match calendar entries. These R-T pairings are referred to herein as calendar-matched pairings.

Next, the transaction interpretation component 210 supplements the R-T pairings associated with the identified matching calendar entries. For example, the transaction interpretation component 210 can add a label to each R-T pairing having a matching calendar entry that identifies the R-T pairing as pertaining to a business expense; this is because the R-T pairing temporally matches a calendar entry in the user's business calendar. In addition, the transaction interpretation component 210 can add any information gleaned from the calendar entry to the R-T pairing. For instance, the transaction interpretation component 210 can add attendee information extracted from the calendar entry to the R-T pairing. The attendee information describes the attendees of the scheduled event.

In another case, assume that the user maintains a single calendar for both business events and personal events. In that case, an optional event-classifying component 212 can, in a preliminary operation, classify each calendar event as personal or business. The event-classifying component 212 can perform this task using a rules-based engine and/or a machine-trained model. For example, the event-classifying component 212 can consider any calendar event that occurs from 8:00 AM to 5:00 PM on a workday as a de facto business-related event. In addition, or alternatively, the event-classifying component 212 can consider any calendar event that takes place at a work-related location (such as at a business park) as a de facto business-related event. In addition, or alternatively, the event-classifying component 212 can consider any calendar event that involves particular participants known to have an affiliation with the user's business as a de facto business-related event, and so on.

The transaction interpretation component 210 can also take into consideration other kinds of context information in supplementing R-T pairings. For example, assume that the matching component 134 has access to a data store (not shown) of previously-encountered R-T pairings that have been previously confirmed by the user, and which have been previously classified by the user as business or personal expenses. The transaction interpretation component 210 can compare a current R-T pairing under consideration with these previously-encountered R-T pairings. For example, the transaction interpretation component 210 can determine whether the current R-T pairing specifies a merchant, location, and purchased good or service, etc. (or some subset thereof) that matches one or more previously-encountered R-T pairings. Upon determining that a match has occurred with a specified degree of confidence, the transaction interpretation component 210 can supplement the current R-T pairing with information extracted from the matching previously-encountered R-T pairing(s). For example, the transaction interpretation component 210 can label the current R-T pairing as a business expense if the prior counterpart(s) have been previously labeled as business expenses. In another example, the transaction interpretation component 210 can use a machine-trained classification model to perform this task. A training system produces this model based on a corpus of previously-encountered R-T pairings. The classification model can correspond to any of a logistic regression model, a support vector machine (SVM) model, a decision tree model, a deep neural network model, etc.

The document-generating component 138 formulates any type of summary document, such as an expense report, based on the R-T pairings in the data store 136. Those R-T pairings include both R-T pairings that have been matched with calendar entries (corresponding to calendar-matched pairings) and R-T pairings that have not been matched with calendar entries. The document-generating component 138 can use any application-specific logic to generate a summary document. In one implementation, the document-generating component 138 generates a summary document by first receiving the user's specification of a reporting period, demarcated by a staring time and an ending time. The document-generating component 138 then culls all R-T pairings from the data store 136 that have transaction times that fall within the reporting period. The document-generating component 138 can then insert this set of R-T pairings into appropriate slots of a chosen document template (that is, chosen from a set of document templates in a data store 214). In preparing the summary document, the document-generating component 138 can also optionally draw from a data store 216 that provides profile information regarding the user, the user's business, and/or the user's client, etc.

Note that other implementations can vary the order of operations relative to that described above. For example, in another implementation, the matching component 134 can first find all transaction items that match calendar entries. The matching component 134 can label these transaction items as de facto business expenses. The matching component 134 can then proceed to match this subset of business-related transaction items with receipt items.

Further note that the automation tool 104 has been described above with respect to the principal task of distinguishing between business-related and personal transactions. But, in another implementation, the automation tool 104 can distinguish between different categories of personal expenses, and/or different categories of business-related expenses.

Figure 3:
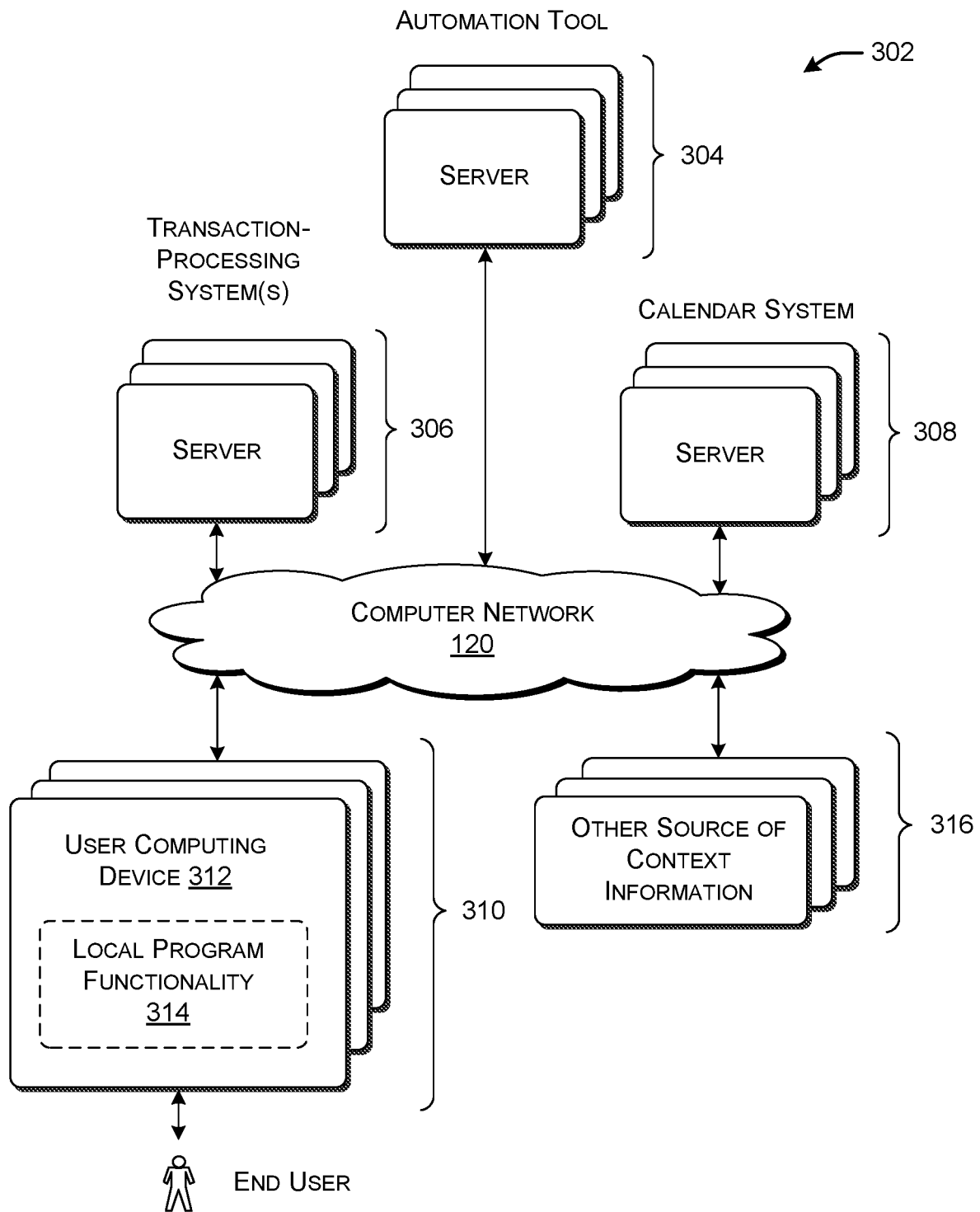
FIG. 3 shows illustrative computing equipment that can be used to implement the computing environment of FIG. 1.

FIG. 3 shows an illustrative computing equipment 302 that can be used to implement the computing environment 102 of FIG. 1. The computing equipment 302 includes one or more servers 304 associated with the automation tool 104, one or more servers 306 associated with the transaction-processing systems 118, and one or more servers 308 associated with the calendar system 126. These servers (304, 306, 308) may communicate with each other via the computer network 120.

One or more user computing devices 310 also communicate with the servers (304, 306, 308) via the computer network 120. Each user computing device can correspond to a computing device of any type, such as, without limitation: a desktop computing device; a laptop computing device; a handheld computing device of any type (such as a smartphone, a tablet-type computing device, etc.); a wearable computing device; a mixed reality device; a game console, etc. FIG. 3 also indicates that a representative user computing device 312 includes local program functionality 314.

The logic of the automation tool 104, described with reference to FIGS. 1 and 2, can be distributed between the servers 304 and the local program functionality 314 in any implementation-specific way. In one case, the servers 304 implement all aspects of the automation tool 104, and each user interacts with that logic via a browser program provided by a local user computing device. In another case, the servers 304 implement all aspects of the automation tool 104 except the UI component 106, which is delegated to each local user computing device. Similarly, the data described above (e.g., the receipt items, transaction items, R-T pairings, etc.) can be distributed between the servers 304 and the local program functionality 314 in any implementation-specific way.

Finally, FIG. 3 indicates that the automation tool 104 can also receive context information from one or more other sources 316 of context information, that is, addition to the calendar system 126. These other sources 316 of context information may be local and/or remote with respect to the location of each user computing devices.

In conclusion to Subsection A.1., the automation tool 104 eliminates many of the manual data entry and analysis tasks performed in traditional bookkeeping operations. It does this by automatically and intelligently integrating information collected from different sources. The automation tool 104 therefore produces a summary document in less time, with potentially fewer errors, compared to traditional bookkeeping operations. It also makes more efficient use of computing resources compared to traditional bookkeeping operations, e.g., because it requires less time to generate a summary document than the traditional bookkeeping operations.

A.2. Illustrative UI Experience

Figures 4, 5:
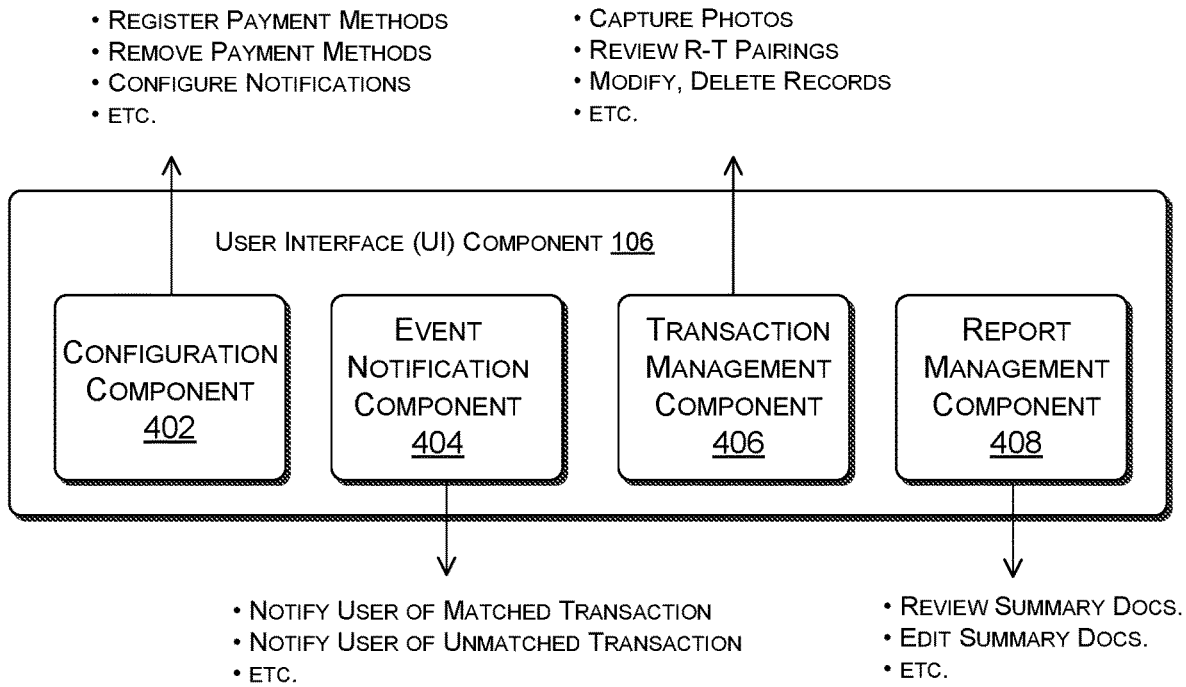
FIG. 4 shows a user interface (UI) component for use in the automation tool of FIG. 1.
FIG. 5 shows an illustrative meeting invitation that creates a calendar entry in a calendar.

FIG. 4 shows a more detailed view of the user interface (UI) component 106 provided by the automation tool 104 of FIG. 1. As previously described, the automation tool 104 can implement the UI component 106 as a standalone module. Alternatively, or in addition, the UI component 106 may be integrated with one or more other logical components of the automation tool 104.

A configuration component 402 provides one or more or UI presentations that allow a user to interact with the administrative component 130. For example, these UI presentations can allow the user to register one or more modes of payment with the transaction-processing systems 118. This prompts the transaction-processing systems 118 to forward transaction items pertaining to these modes of payment to the automation tool 104. The UI presentations provided by the configuration component 402 also allow the user to customize the operation of different aspects of the automation tool 104, such as its notification-related behavior.

An event notification component 404 provides one or more notifications that alert the user to the occurrence of various events. For example, the event notification component 404 provides a notification that indicates that a receipt item has been matched with a transaction item. It also provides a notification that alerts the user to the fact that a receipt item has not yet been matched with a transaction item in a span of time in which a match is expected to occur (e.g., five days in one case).

A transaction management component 406 provides various UI presentations that allow a user to manage the formation and interpretation of R-T pairings. For example, these UI presentations can allow the user to capture a new digital photograph of a physical receipt, confirm or reject a proposed R-T pairing, manually edit any transaction items or R-T pairings, etc.

A report management component 408 provides one or more UI presentations that allow the user to manage the formation of a summary document. For example, these presentations can allow the user to create and edit an expense report based on R-T pairings generated by the matching component 134.

FIG. 5 shows an illustrative meeting invitation 502 that an organizer (Joe Baker) sends by Email to two recipients (Bill Jones and Martha Smith), who work for the company Acme Corp. This invitation 502 establishes a calendar entry in the organizer's business calendar. This calendar entry, in turn, will serve as an illustrative example in this subsection. More specifically, assume that the organizer sets up an appointment to meet the two recipients for lunch at a restaurant in downtown Seattle, followed by an afternoon baseball game at a local stadium. The calendar entry includes time information 504 that indicates that the event begins on noon on April 3rd, 2019 and ends at 6:30 PM on the same day. The calendar entry also includes attendee information 506 that specifies the people who will attend the event (here, Joe Baker, Bill Jones, and Martha Jones).

In practice, the user may purposely create rich calendar entries to assist the automation tool 106 in interpreting the user's transactions. For example, assume that a user plans to conduct a one-hour meeting with a client at a particular location. Further assume that the user expects to perform various activities in connection with the meeting for three hours preceding the meeting and/or three hours after the meeting. The user may assist the automation tool 106 by creating a first meeting invitation for the meeting itself, a personal task for the three hours preceding the meetings, and/or a personal task for the three hours following the meeting. In this manner, the automation tool 106 will interpret any expense that is incurred during this entire seven-hour span of time as connected with the meeting.

Figure 6:
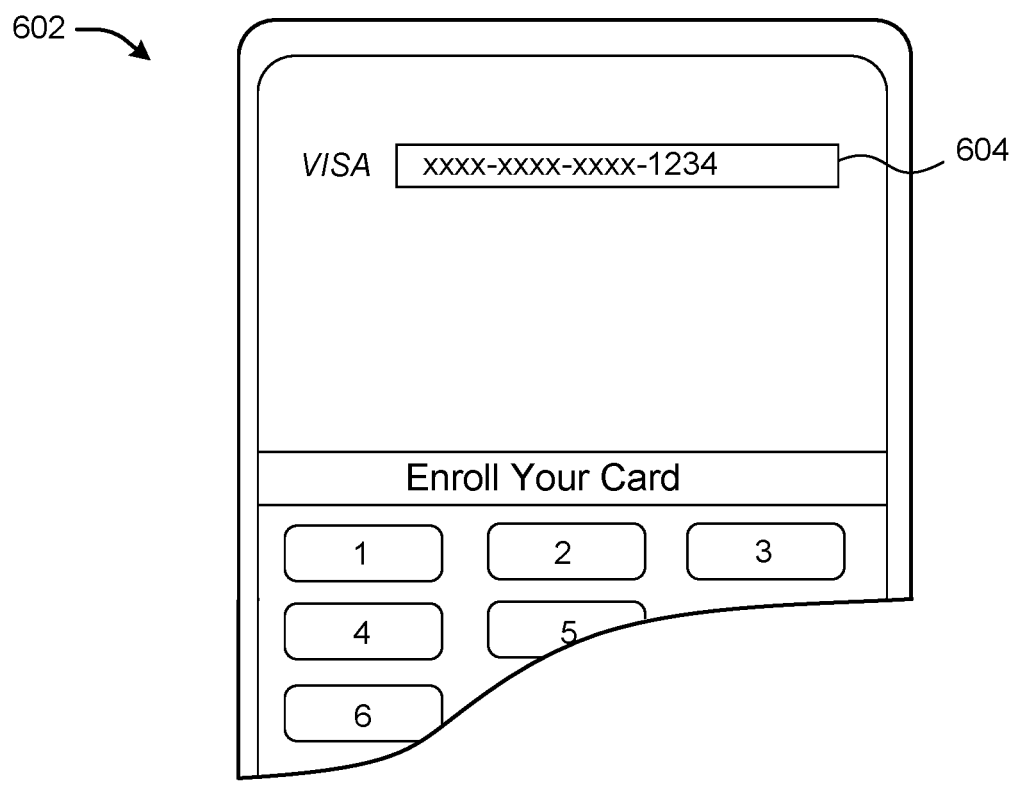
FIG. 6 shows a UI presentation that allows a user to register a form of payment for use in the computing environment of FIG. 1.

FIG. 6 shows a UI presentation 602 that allows a user to register a form of payment. Here, the user enters the account number of a credit card in an input text box 604. Upon receiving this information, the administrative component 130 registers the user's account number with the appropriate transaction-processing system. Thereafter, the transaction-processing systems 118 will forward transaction items associated with this credit card number to the automation tool 104 as soon as they are captured. This behavior is what is referred to herein as real time.

Figure 7:
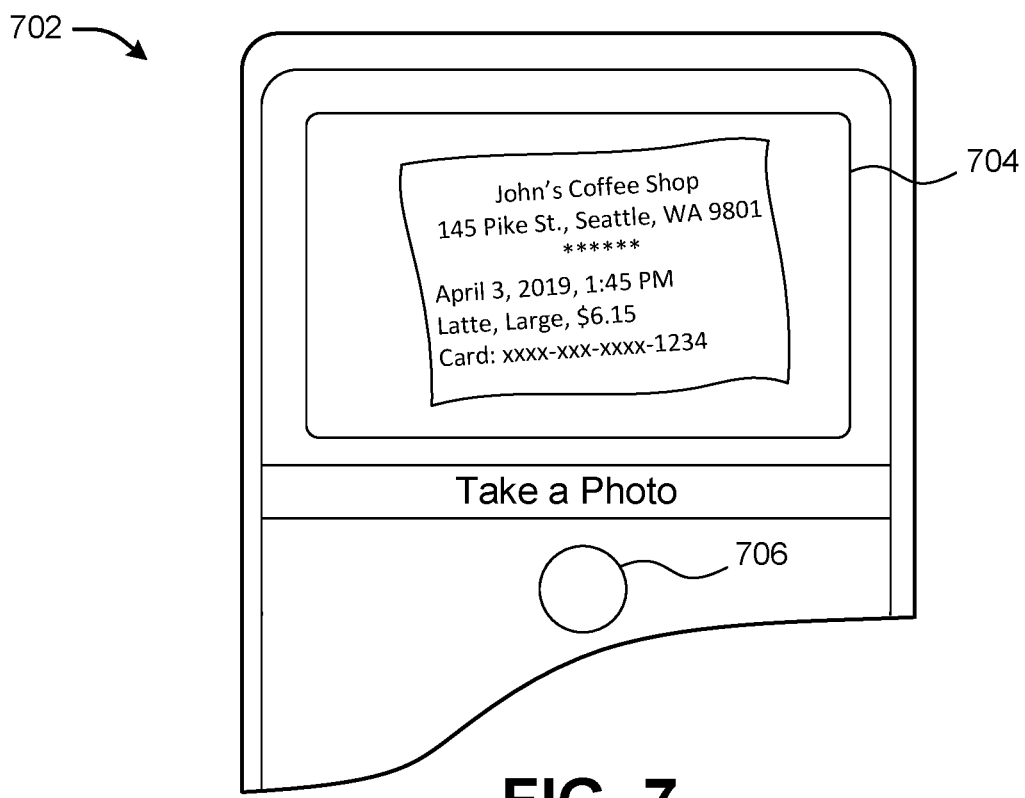
FIG. 7 shows an illustrative user experience in which a user takes a digital photograph of a physical receipt.

FIG. 7 shows an illustrative user experience in which a user takes a digital photograph of a physical receipt. In operation, the user activates a graphical control (not shown) when he or she wishes to take a picture of a physical receipt. This action activates a picture-taking UI presentation 702. At the juncture shown in FIG. 7, the user is pointing the digital camera at the physical receipt. The UI presentation 702 shows an image 704 of that receipt. The user then activates a graphical control 706 to take a digital photograph of the physical receipt. In another user experience (not shown), the user can select a previously-captured digital photograph of a receipt that the user has stored in an archive of digital photographs.

Assume here that the physical receipt is given to the user after purchasing coffee at a coffee shop ("John's Coffee Shop") in downtown Seattle. The receipt-processing component 112 uses its image-classifying component 202 to determine that the resultant image is a candidate receipt. It then uses its OCR component 204 to convert the image content of the image into alphanumeric information. Note that the receipt indicates that the coffee was purchased at a time (1:45 PM) that occurs within the block of time slated for the user's visit with his client, Acme Corp.

Figure 8:
FIG. 8 shows a UI presentation that notifies the user that a receipt item has been matched with a transaction item, to provide a receipt-transaction (R-T) pairing.

FIG. 8 shows a UI presentation 802 that provides a notification 804 that alerts the user when the receipt item shown in FIG. 7 has been matched with a transaction item. The notification 804 can optionally include a thumbnail image 806 of the digital photograph of the receipt item. The user can review this candidate pairing by taping on the notification 804, or performing any other activation operation.

Figure 9:
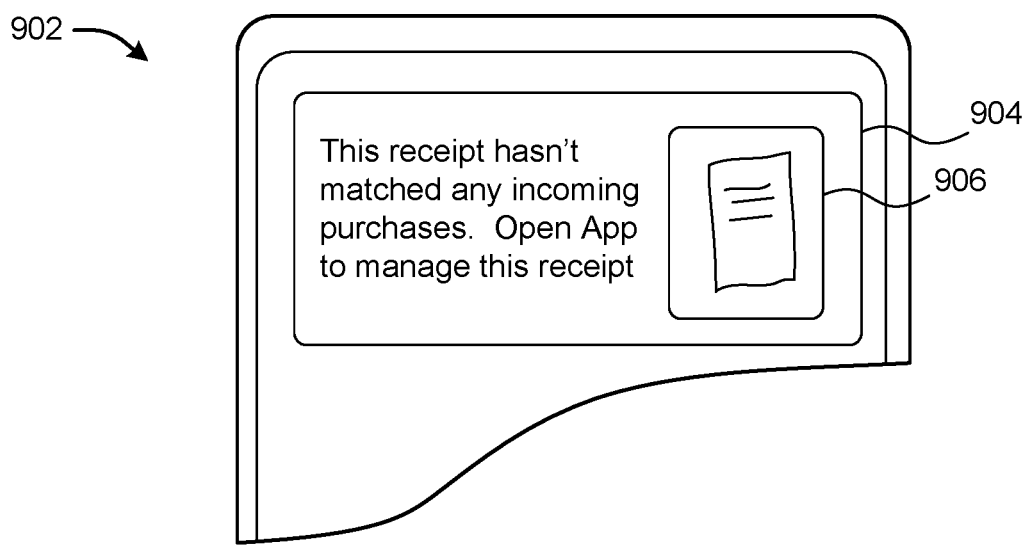
FIG. 9 shows a UI presentation that notifies the user that a receipt item has not yet been matched with any transaction item.

FIG. 9 shows a UI presentation 902 that provides a notification 904 that alerts the user to the fact that a match has not been found for the receipt item shown in FIG. 7 within a period of time in which a match is expected to occur (e.g., five days). The notification 904 can optionally include a thumbnail image 906 of the digital photograph of the receipt item. The user can take action with respect to this unmatched receipt item by taping on the notification 904, or performing any other activation operation.

Figure 10:
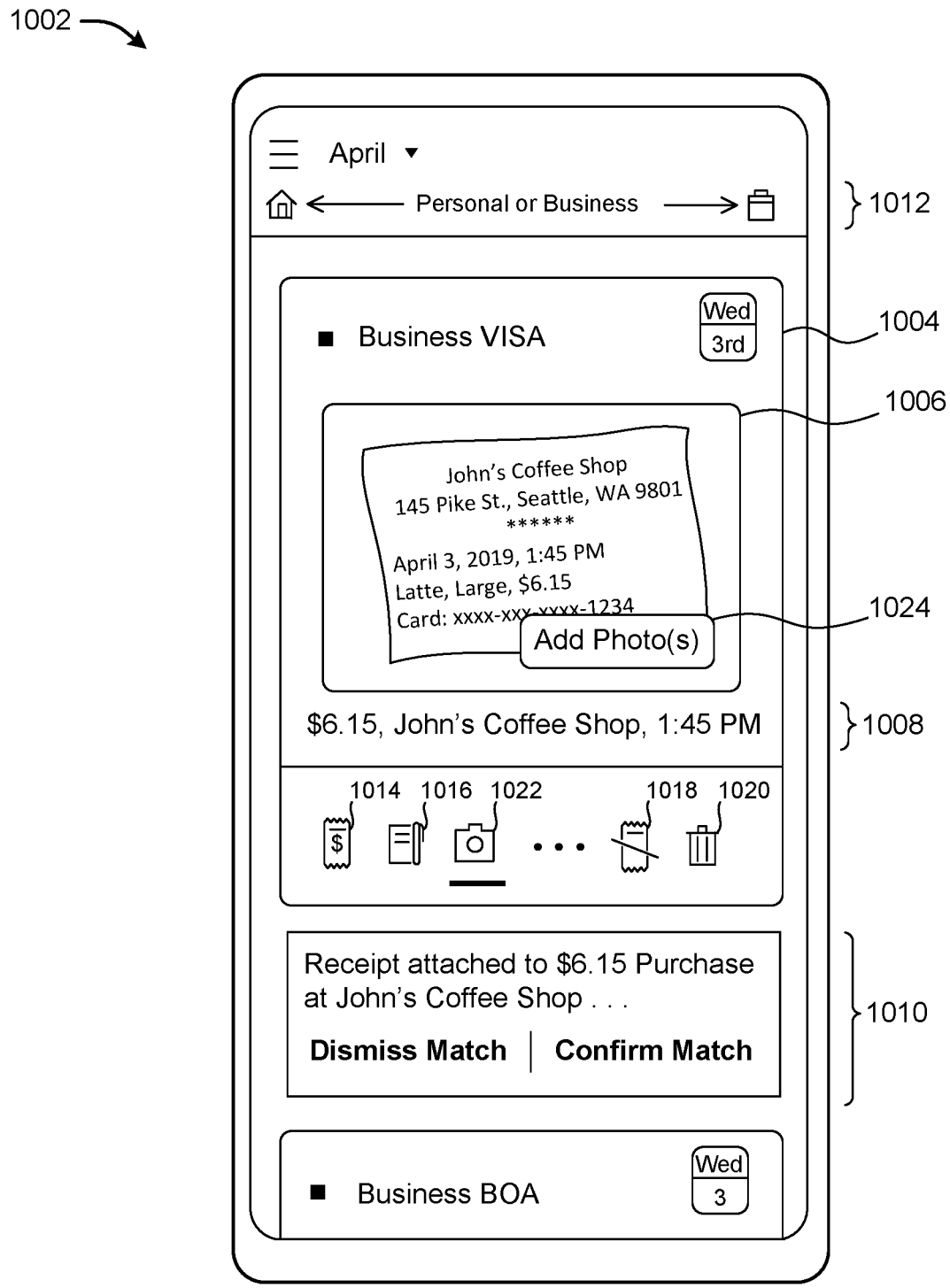
FIG. 10 shows a UI presentation that asks the user to confirm or reject a proposed R-T pairing.

FIG. 10 shows a UI presentation 1002 that presents information in a graphical card 1004 regarding a proposed R-T pairing, and which allows a user to take various actions with respect to the R-T pairing. In this case, the UI presentation 1002 notifies the user that the receipt item captured in FIG. 7 has been matched with a transaction item received from a transaction-processing system for a purchase at John's Coffee Shop. The user may scroll down or up in the UI presentation 1002 to view other proposed R-T pairings associated with other respective graphical cards. The automation tool 104 can arrange these graphical cards in chronological order, according to purchase date and time. (As will be described below, the UI presentation 1002, and/or one or more other UI presentations, can also show graphical cards associated with unmatched transaction items and/or unmatched receipt items.)

In this illustrative implementation, the graphical card 1004 shows an image 1006 of the physical receipt associated with the R-T pairing associated with the graphical card 1004. It also presents textual information 1008 regarding the transaction. A message 1010 informs the user that the illustrated receipt has matched a purchase at John's Coffee Shop. This message also invites the user to confirm this pairing or reject it. Alternatively, as a default, the automation tool 104 will consider the pairing confirmed unless the user explicitly rejects it (thus eliminating the need for the user to click on "confirm" for each proposed R-T pairing). Alternatively, the automation tool 104 can only present candidate R-T pairings for the user's review that have a confidence score below a prescribed environment-specific threshold level; R-T pairings at or above this level are considered confirmed by default. The automation tool 104 can nevertheless allow the user to review and modify any R-T pairing upon request, regardless of the level of confidence associated therewith.

Assume that the user rejects the R-T pairing shown in the graphical card 1004. The automation tool 104 can respond to the user's input decision by decoupling the transaction item and the receipt item associated with the R-T pairing. This decoupling operation returns the associated receipt item and transaction item to the pools of unmatched receipt items and transaction items, respectively. The automation tool 104 can also allow the user to perform various actions with respect to the now-unmatched receipt item, explained in greater detail below in connection with FIG. 12.

The UI presentation 1002 also includes other graphical controls that allow the user to perform different actions regarding the proposed R-T pairing. For example, as instructed by arrow 1012, a user may swipe left or right on the graphical card 1004 to classify the associated R-T pairing as personal or business-related, respectively. The user can activate another graphical control 1014 to view more detailed information regarding the R-T pairing. The user may activate another graphical control 1016 to add handwritten notes to the R-T pairing (e.g., via markings made on a touch-sensitive surface). The user may activate another graphical control 1018 to split the R-T pairing into two or more separate transactions. The user may activate another graphical control 1020 to delete the R-T pairing, along with its associated receipt item and transaction item. At the present time, assume that the user has activated a graphical control 1022 to view the image 1006 of the receipt, as indicated by the bar beneath the graphical control 1022. Finally, a user may activate a graphical control 1024 to add one or more additional digital photographs to the R-T pairing. If the user activates this graphical control 1024, the UI flow advances to the kind of UI presentation 702 shown in FIG. 7.

The UI experience described above can be varied in different ways. For example, in another case, the matching component 134 may match a receipt item with n transaction items, each such candidate pairing having approximately the same level of confidence. In that case, the UI component 106 can present n graphical cards associated with these n proposed R-T pairings, and allow the user to choose the correct pairing (if any). When the user confirms one of the proposed R-T pairings, the automation tool automatically rejects the other proposed R-T pairings.

Figure 11:
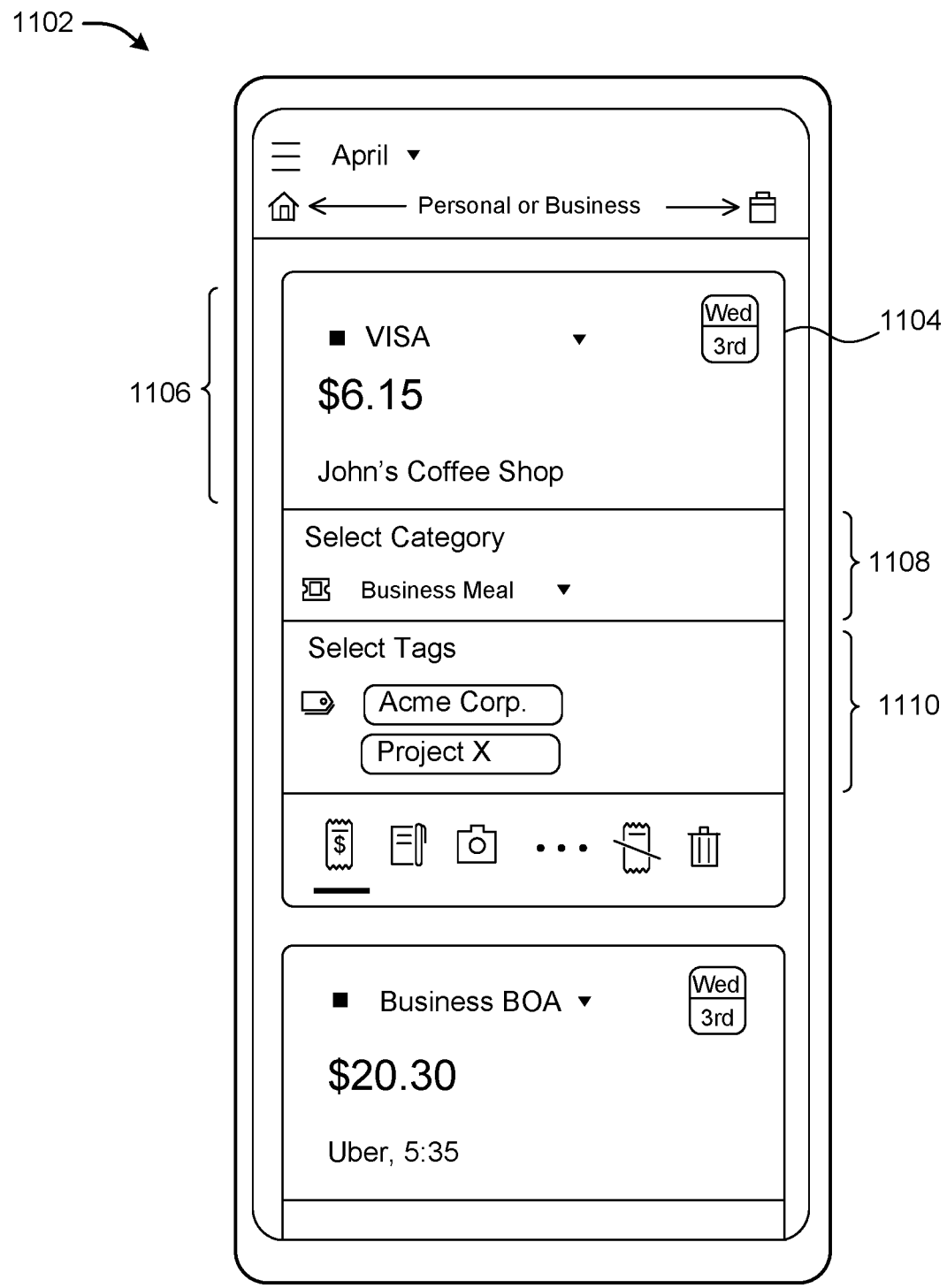
FIG. 11 shows a transaction detail view of the R-T pairing of FIG. 10.

FIG. 11 shows a UI presentation 1102 that is produced when the user activates the graphical control 1014 of FIG. 10. The UI presentation 1102 shows more detailed information regarding the R-T pairing in a graphical card 1104. That is, the graphical card 1104 includes textual metadata 1106 regarding the R-T pairing. The graphical card 1104 also includes a classification section 1108 that describes the classification of the transaction associated with the R-T pairing, as defined by the user, and/or as automatically detected. The classification section 1108 also includes a graphical control (e.g., a drop down menu) that allows the user to manually change the classification. The graphical card 1104 also includes a tag section 1110 that shows one or more descriptive tags associated with the R-T pairing, as defined by the user, and/or as automatically detected. The tag section 1110 also includes a graphical control that allows a user to add one or more additional tags to the R-T pairing. Among other possible uses, the document-generating component 138 can filter R-T pairings based on the tags added by the user.

Figure 12:
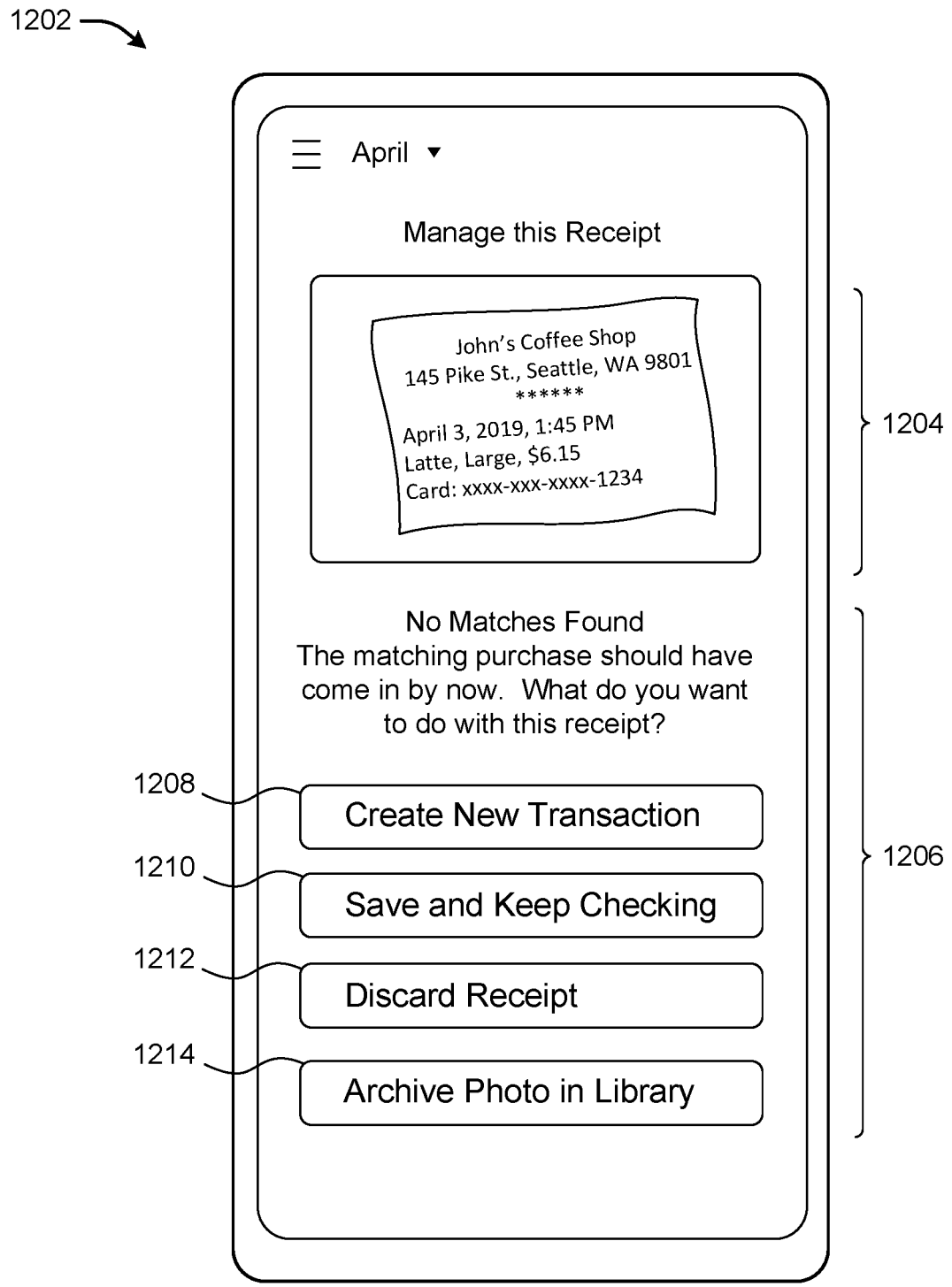
FIG. 12 shows a UI presentation that invites the user to specify how a receipt item that has not yet been matched with any transaction item is to be handled.

FIG. 12 shows a UI presentation 1202 that invites the user to specify how a receipt item that has not yet been matched with any transaction item is to be handled. The UI presentation 1202 includes an image 1204 of the receipt item under consideration. The UI presentation 1202 also includes various graphical controls 1206 for performing various actions with respect to the unmatched receipt item. A first graphical control ("Create New Transaction") 1208 instructs the automation tool 104 to create a new transaction item for the receipt item, rather than waiting for a transaction item to arrive from the transaction-processing systems 118. For example, upon activating this graphical control 1208, the automation tool 104 can populate a new transaction item from metadata extracted from the receipt item. Alternatively, or in addition, activating the graphical control 1208 invokes a UI presentation (not shown) that allows the user to independently specify the metadata associated with the transaction item, e.g., by typing in the merchant's name, the purchase amount, the purchase date and time, etc. In the context of FIG. 1, the manual expense-logging component 124 performs the above functions.

A second graphical control 1210 instructs the automation tool 104 to continue to look for a transaction item that matches the receipt item. A third graphical control 1212 instructs the automation tool 104 to delete the receipt item (which also terminates its attempt to find a matching transaction item). A fourth graphical control 1214 instructs the automation tool 104 to archive the receipt item in a data store (which also terminates its attempt to find a matching transaction item).

The UI presentation 1202 of FIG. 12 handles the case in which the automation tool 104 cannot find a transaction item that matches an already-existing receipt item. In a complementary scenario, assume that an already-existing transaction item is encountered that does not match any receipt item. In this case, the automation tool 104 can use the kind of UI presentation 1002 shown in FIG. 10 to provide a graphical card associated with each unmatched transaction item. The user may then interact with the graphical control 1024 in each graphical card to create a digital photo to be attached to a corresponding unmatched transaction item.

FIG. 13 shows a UI presentation 1302 that provides an illustrative expense report. The UI presentation 1302 shows an optional control section 1304 that allows the user to choose various parameters that govern the report that is generated. For example, the UI control section 1304 includes a date-picker graphical control 1306 that allows the user to choose a span of time associated with the report. The document-generating component 138 will respond to this selection by listing transactions within the identified span of time. A filter-by graphical control 1308 allows the user to choose one or more filtering factors associated with the report. The document-generating component 138 will respond to this selection by presenting only transactions that are tagged with the specified filtering factors. A report-type graphical control 1310 allows the user to choose a type of report. The document-generating component 138 will respond to this selection by retrieving and filling out an appropriate document template from the data store 214 (of FIG. 2). Assume that the user has selected an icon associated with an expense report.

A second section 1312 shows a portion of a generated expense report. Each entry of the expense report includes information potentially extracted from a receipt item, a matching transaction item, and a matching calendar entry. For example, two of the purchases in the expense report identify the attendees of a scheduled meeting. The automation tool associates this meeting with the purchases because the purchases were made during the meeting. Each entry may also include a link (such as representative link 1314) or thumbnail (not shown) that a user may activate to invoke the presentation of an image of a receipt associated with the entry.

Different implementations can optionally group the transaction information in the second section 1312 in different respective ways. In the merely illustrative case of FIG. 13, the document-generating component 138 groups all transactions that occur during a given calendar meeting into a cluster, and assigns that cluster to a graphical card.

B. Illustrative Processes

Figure 15:
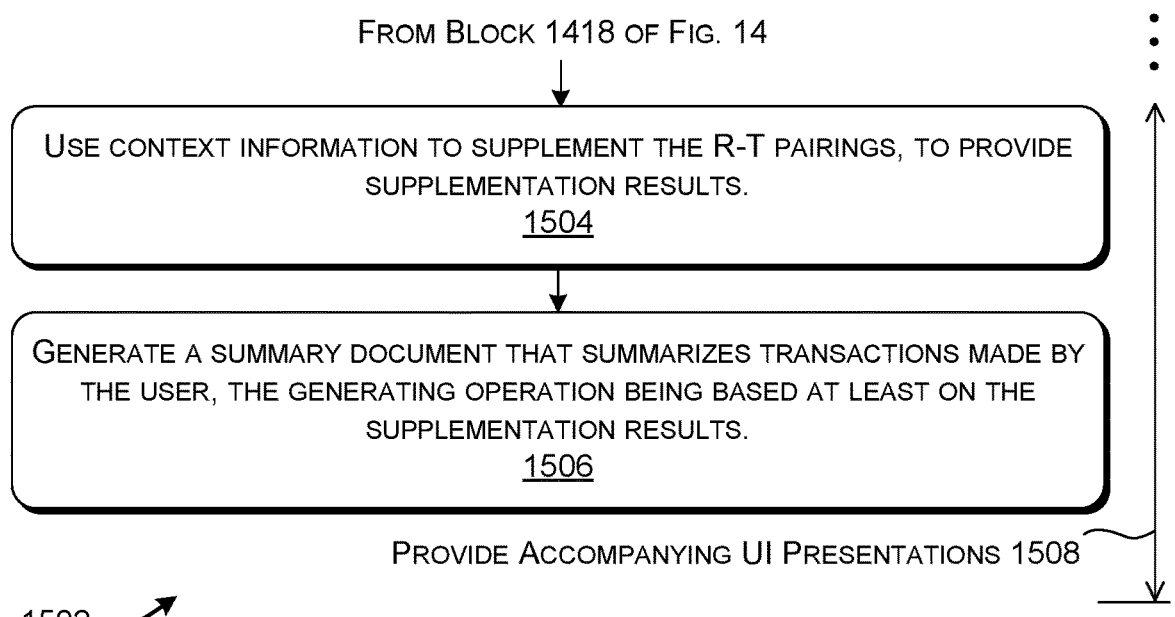
FIG. 15 is a flowchart that shows a process for interpreting R-T pairings based on context information.
Figure 16:
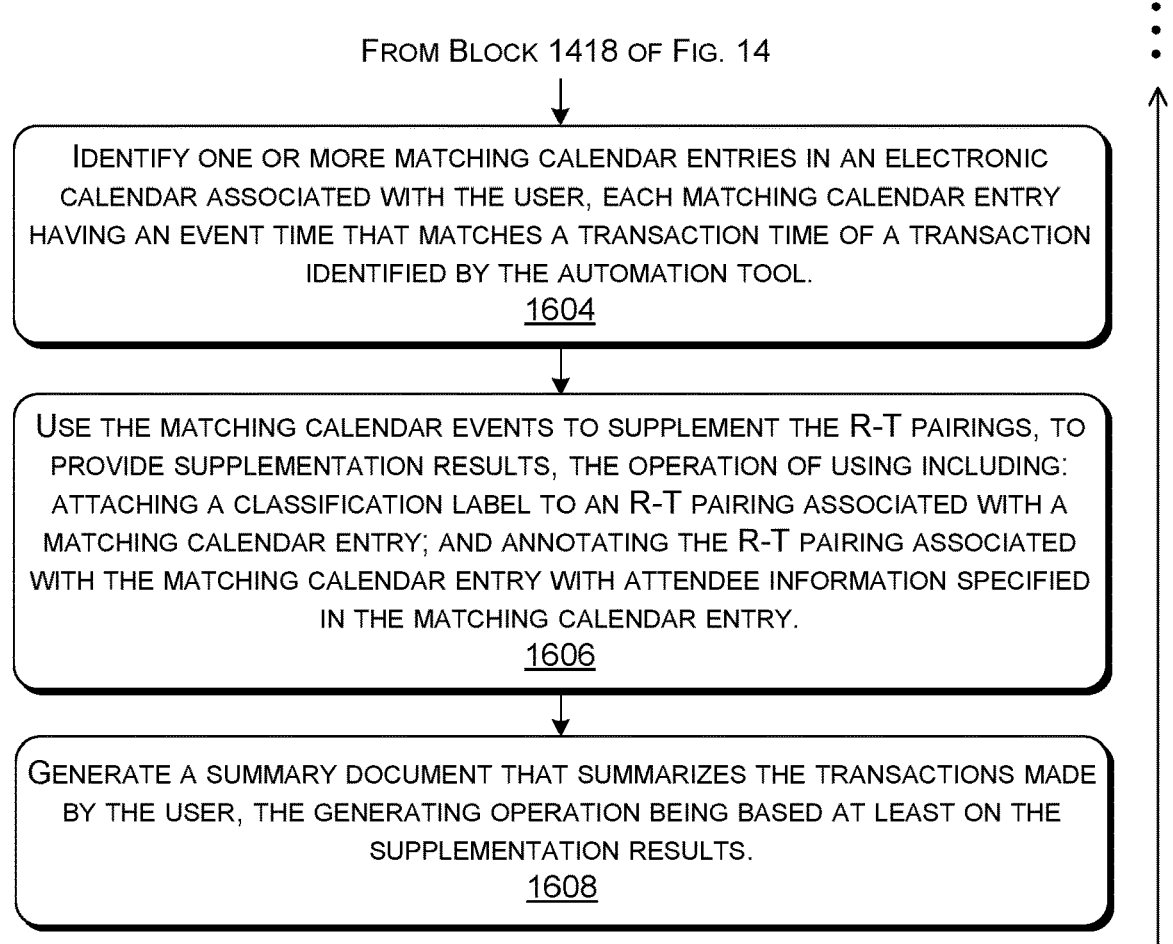
FIG. 16 is a flowchart that shows a process for interpreting R-T pairings based on calendar information. That is, in FIG. 16, the context information corresponds to calendar information.

FIGS. 14-16 show processes that explain the operation of the computing systems of Section A in flowchart form. Since the principles underlying the operation of the computing systems have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 14 shows a process 1402 for matching receipt items with transaction items, to provide proposed R-T pairings. In block 1404, the automation tool 104 receives images from a digital camera. In block 1406, the automation tool 104 detects, using the image-classifying component 202, a subset of the images that correspond to candidate receipts, each candidate receipt that is associated with a physical receipt containing image content that represents the physical receipt. In block 1408, the automation tool 104 converts, using the optical character recognition component 204, the image content in the candidate receipts into symbolic information, to provide recognized receipt items. In block 1410, the automation tool 104 stores the receipt items in a data store 114. In block 1412, the automation tool 104 receives a stream of transaction items from one or more computer-implemented transaction-processing systems 118, each transaction item providing an electronic record of a transaction made by the user, as captured by a transaction-processing system and then forwarded to the automation tool 104 via a computer network. In block 1414, the automation tool 104 stores the transaction items in a data store 122. In block 1416, the automation tool 104 identifies one or more matching receipt-transaction (R-T) pairings, each R-T pairing including a pairing of a receipt item and a transaction item that describe a same transaction made by the user. Each R-T pairing is also linked to an image associated with its receipt item. In block 1418, the automation tool 104 stores information regarding the R-T pairing(s) in a data store 136.

FIG. 15 shows a process 1502 for interpreting R-T pairings based on context information. In block 1504, the automation tool 104 uses context information to supplement the R-T pairings, to provide supplementation results. In block 1506, the automation tool 104 generates a summary document that summarizes transactions made by the user, the generating operation being based at least on the supplementation results. In operation 1508, the automation tool 104 presents one or more user interface presentations on a display device. The user interface presentations including at least: one or more user interface presentations that enable the user to register a form of payment with the transaction-processing systems 118; one or more user interface presentations that enable the user to review and act on proposed R-T pairings; one or more user interface presentations that enable the user to enter instructions regarding unmatched receipt items; and one or more user interface presentations that enable the user to review the summary document. FIG. 15 indicates that operation 1508 can occur contemporaneously with any of the other blocks.

FIG. 16 shows a process 1602 for interpreting R-T pairings based on calendar information. That is, in FIG. 16, the context information corresponds to calendar information. In block 1604, the automation tool 104 identifies one or more matching calendar entries in an electronic calendar associated with the user, each matching calendar entry having an event time that matches a transaction time of a transaction identified by the automation tool 104. In block 1606, the automation tool 104 uses the matching calendar events to supplement the R-T pairings, to provide supplementation results. In block 1608, the automation tool 104 generates a summary document that summarizes transactions made by the user, the generating operation being based at least on the supplementation results. In one implementation, the operation of using (in block 1606) can include: attaching a classification label to an R-T pairing associated with a matching calendar entry; and annotating the R-T pairing associated with the matching calendar entry with attendee information specified in the calendar entry. In operation 1610, the automation tool 104 presents one or more user interface presentations of the type(s) described above on a display device.

Note that, in the above flowchart, the pairing of receipt items and transaction items precedes the matching of transactions with calendar entries (and/or other context information). But the processes of FIGS. 14-16 are also meant to encompass the scenario in which the receipt items and/or transaction items are matched with calendar entries (and/or other context information), and then the calendar-matched receipt items and transaction items are paired together.

C. Representative Computing Functionality

Figure 17:
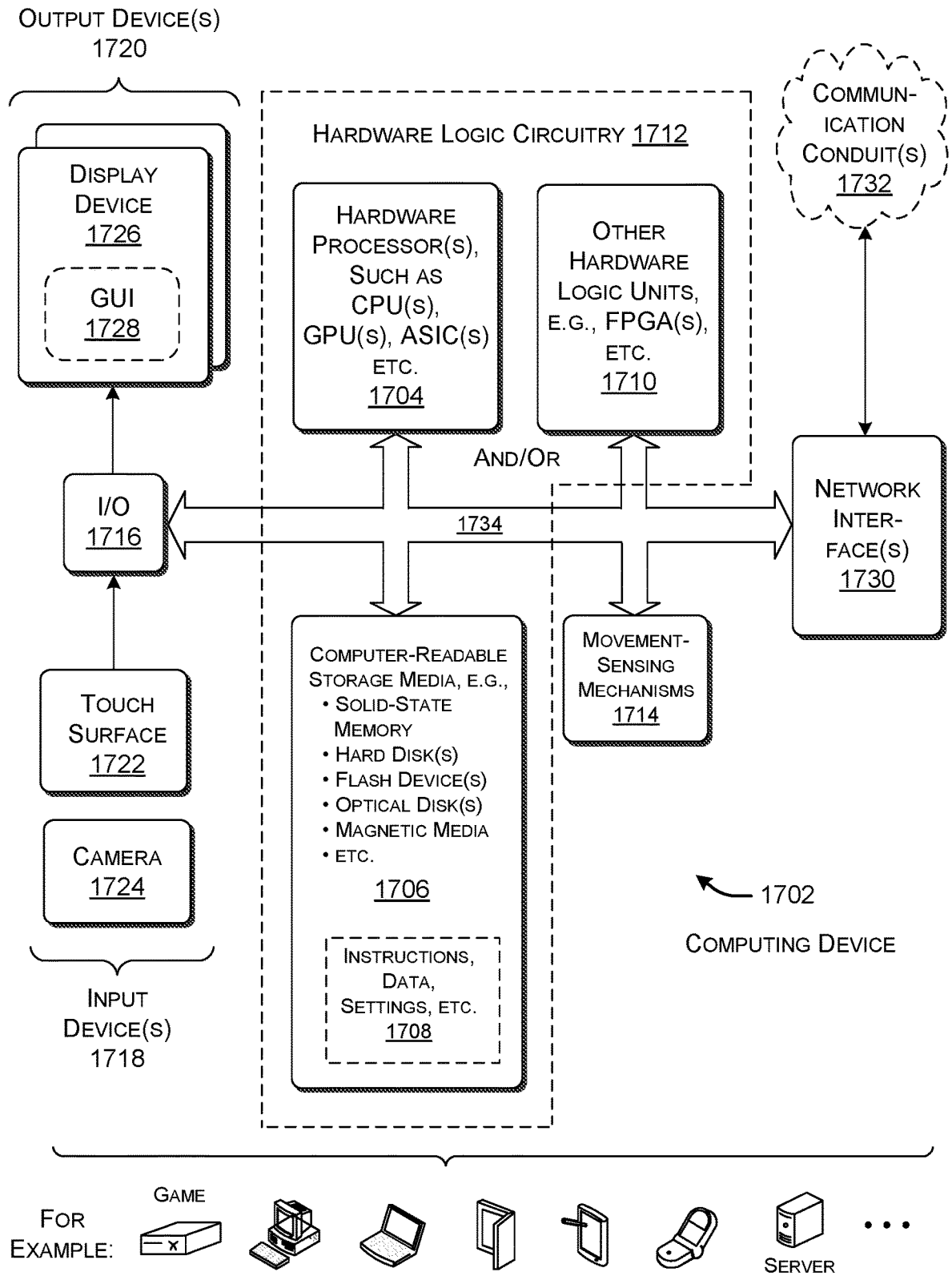
FIG. 17 shows an illustrative type of computing device that can be used to implement any aspect of the features shown in the foregoing drawings.

FIG. 17 shows a computing device 1702 that can be used to implement any aspect of the mechanisms set forth in the above-described figures. For instance, the type of computing device 1702 shown in FIG. 17 can be used to implement any computing device (server, user computing device, etc.) shown in FIG. 3. In all cases, the computing device 1702 represents a physical and tangible processing mechanism.

The computing device 1702 can include one or more hardware processors 1704. The hardware processor(s) 1704 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1702 can also include computer-readable storage media 1706, corresponding to one or more computer-readable media hardware units. The computer-readable storage media 1706 retains any kind of information 1708, such as machine-readable instructions, settings, data, etc. Without limitation, for instance, the computer-readable storage media 1706 may include one or more solid-state devices, one or more magnetic hard disks, one or more optical disks, magnetic tape, and so on. Any instance of the computer-readable storage media 1706 can use any technology for storing and retrieving information. Further, any instance of the computer-readable storage media 1706 may represent a fixed or removable unit of the computing device 1702. Further, any instance of the computer-readable storage media 1706 may provide volatile or non-volatile retention of information.

The computing device 1702 can utilize any instance of the computer-readable storage media 1706 in different ways. For example, any instance of the computer-readable storage media 1706 may represent a hardware memory unit (such as Random Access Memory (RAM)) for storing transient information during execution of a program by the computing device 1702, and/or a hardware storage unit (such as a hard disk) for retaining/archiving information on a more permanent basis. In the latter case, the computing device 1702 also includes one or more drive mechanisms, such as a hard drive mechanism (not shown), for storing and retrieving information from an instance of the computer-readable storage media 1706.

The computing device 1702 may perform any of the functions described above when the hardware processor(s) 1704 carry out computer-readable instructions stored in any instance of the computer-readable storage media 1706. For instance, the computing device 1702 may carry out computer-readable instructions to perform each block of the processes described in Section B.

Alternatively, or in addition, the computing device 1702 may rely on one or more other hardware logic units 1710 to perform operations using a task-specific collection of logic gates. For instance, the other hardware logic unit(s) 1710 may include a fixed configuration of hardware logic gates, e.g., that are created and set at the time of manufacture, and thereafter unalterable. Alternatively, or in addition, the other hardware logic unit(s) 1710 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 17 generally indicates that hardware logic circuitry 1712 includes any combination of the hardware processor(s) 1704, the computer-readable storage media 1706, and/or the other hardware logic unit(s) 1710. That is, the computing device 1702 can employ any combination of the hardware processor(s) 1704 that execute machine-readable instructions provided in the computer-readable storage media 1706, and/or one or more other hardware logic unit(s) 1710 that perform operations using a fixed and/or programmable collection of hardware logic gates. More generally stated, the hardware logic circuitry 1712 corresponds to one or more hardware logic units of any type(s) that perform operations based on logic stored in and/or otherwise embodied in the hardware logic unit(s).

In some cases (e.g., in the case in which the computing device 1702 represents a portable computing device), the computing device 1702 also includes one or more movement-sensing devices 1714 for detecting movement of the computing device 1702. The movement-sensing devices 1714 can include any of: a Global Positioning System (GPS) device; a device that determines the position of the computing device 1702 based on one or more terrestrial signal sources; one or more accelerometers; one or more gyroscopes; one or magnetometers, etc.

In some cases (e.g., in the case in which the computing device 1702 represents a user computing device), the computing device 1702 also includes an input/output interface 1716 for receiving various inputs (via input devices 1718), and for providing various outputs (via output devices 1720). Illustrative input devices include a keyboard device, a mouse input device, a touchscreen input device 1722, a digitizing pad, one or more static image cameras 1724, one or more video cameras, one or more depth camera systems, one or more microphones, a voice recognition mechanism, and so on. One particular output mechanism may include a display device 1726 and an associated graphical user interface presentation (GUI) 1728. The display device 1726 may correspond to a liquid crystal display device, a light-emitting diode display (LED) device, a projection mechanism, etc. Other output devices include a printer, one or more speakers, a haptic output mechanism, an archival mechanism (for storing output information), and so on. The computing device 1702 can also include one or more network interfaces 1730 for exchanging data with other devices via one or more communication conduits 1732. One or more communication buses 1734 communicatively couple the above-described units together.

The communication conduit(s) 1732 can be implemented in any manner, e.g., by a local area computer network, a wide area computer network (e.g., the Internet), point-to-point connections, etc., or any combination thereof. The communication conduit(s) 1732 can include any combination of hardwired links, wireless links, routers, gateway functionality, name servers, etc., governed by any protocol or combination of protocols.

FIG. 17 shows the computing device 1702 as being composed of a discrete collection of separate units. In some cases, the collection of units may correspond to discrete hardware units provided in a computing device chassis having any form factor. FIG. 17 shows illustrative form factors in its bottom portion. In other cases, the computing device 1702 can include a hardware logic unit that integrates the functions of two or more of the units shown in FIG. 17. For instance, the computing device 1702 can include a system on a chip (SoC or SOC), corresponding to an integrated circuit that combines the functions of two or more of the units shown in FIG. 17.

The following summary provides a non-exhaustive set of illustrative aspects of the technology set forth herein.

According to a first aspect, one or more computing devices are described that implement an automation tool for processing transactions made by a user. The computing device(s) include hardware logic circuitry, the hardware logic circuitry including: (a) one or more hardware processors that perform operations by executing machine-readable instructions stored in a memory, and/or (b) one or more other hardware logic units that perform operations using a task-specific collection of logic gates. The operations include: receiving images from a digital camera; detecting, using an image-classifying component implemented by the hardware logic circuitry, a subset of the images that correspond to candidate receipts, each candidate receipt that is associated with a physical receipt containing image content that represents the physical receipt; converting, using an optical character recognition component implemented by the hardware logic circuitry, the image content in the candidate receipts into symbolic information, to provide recognized receipt items; storing the receipt items in a data store; receiving a stream of transaction items from one or more computer-implemented transaction-processing systems, each transaction item providing an electronic record of a transaction made by the user, as captured by a transaction-processing system and then forwarded to the automation tool via a computer network; storing the transaction items in a data store; identifying one or more matching receipt-transaction (R-T) pairings, each R-T pairing including a pairing of a receipt item and a transaction item that describe a same transaction made by the user, each R-T pairing also being linked to an image associated with its receipt item; storing information regarding the one or more R-T pairings in a data store; identifying one or more matching calendar entries in an electronic calendar associated with the user, each matching calendar entry having an event time that matches a transaction time of a transaction identified by the automation tool; using the matching calendar events to supplement the R-T pairings, to provide supplementation results; and generating a summary document that summarizes transactions made by the user, the operation of generating being based at least on the supplementation results. The operation further include presenting one or more user interface presentations on a display device, the user interface presentations including at least: one or more user interface presentations that enable the user to register a form of payment with the transaction-processing systems; one or more user interface presentations that enable the user to review and act on proposed R-T pairings; one or more user interface presentations that enable the user to enter instructions regarding unmatched receipt items; and one or more user interface presentations that enable the user to review the summary document.

According to a second aspect, the operations further include receiving a registration by the user, via a user interface presentation, of one or more account numbers associated with one or more respective form(s) of payment. The stream of transaction items pertains to transactions made by the user using the forms of payment, as captured by the one or more transaction-processing systems.

According to a third aspect, the operations further include: detecting that a receipt item matches a transaction item, to identify a newly-matched R-T pairing; sending an alert to the user that notifies the user of the newly-matched R-T pairing; and providing a prompt to the user, via a user interface presentation, which invites the user to reject the newly-matched R-T pairing.

According to a fourth aspect, the operations further include: detecting that a receipt item has not been matched with a transaction item within a prescribed amount of time since creation of the receipt item, that receipt item corresponding to an unmatched receipt item; sending an alert to the user that notifies the user of the unmatched receipt item; and providing a prompt to the user, via a user interface presentation, which invites the user to take an action with respect to the unmatched receipt item.

According to a fifth aspect, relating to the fourth aspect, the prompt invites the user to instruct the automation tool to continue to try to match the unmatched receipt item with newly-received transaction items.

According to a sixth aspect, relating to the fourth aspect, the prompt invites the user to instruct the automation tool to cease attempting to match the unmatched receipt item with transaction items.

According to a seventh aspect, relating to the fourth aspect, the prompt invites the user to use the automation tool to create a matching transaction item for the unmatched receipt item.

According to an eighth aspect, relating to the seventh aspect, the operations further include creating a matching transaction item based, at least in part, on information contained in the unmatched receipt item.

According to a ninth aspect, the operation of using includes attaching a classification label to an R-T pairing associated with a matching calendar entry.

According to a tenth aspect, relating to the ninth aspect, one kind of classification label specifies that the R-T pairing associated with the matching calendar entry describes a business expense.

According to an eleventh aspect, the operation of using includes annotating an R-T pairing associated with a matching calendar entry with attendee information specified in the matching calendar entry.

According to a twelfth aspect, the operations further include removing a receipt item and a transaction item from a pool of unmatched receipt items and a pool of unmatched transaction items, respectively, upon matching the receipt item and the transaction item.

According to a thirteenth aspect, a method is described for processing transactions made by a user using a computer-implemented automation tool. The method includes: receiving images from a digital camera; detecting, using an image-classifying component implemented by the automation tool, a subset of the images that correspond to candidate receipts, each candidate receipt that is associated with a physical receipt containing image content that represents the physical receipt; converting, using an optical character recognition component implemented by the automation tool, the image content in the candidate receipts into symbolic information, to provide recognized receipt items; storing the receipt items in a data store; receiving a stream of transaction items from one or more computer-implemented transaction-processing systems, each transaction item providing an electronic record of a transaction made by the user, as captured by a transaction-processing system and then forwarded to the automation tool via a computer network; storing the transaction items in a data store; identifying one or more matching receipt-transaction (R-T) pairings, each R-T pairing including a pairing of a receipt item and a transaction item that describe a same transaction made by the user, each R-T pairing also being linked to an image associated with its receipt item; storing information regarding the one or more R-T pairings in a data store; using context information to supplement the R-T pairings, to provide supplementation results; and generating a summary document that summarizes transactions made by the user, the operation of generating being based at least on the supplementation results.

According to a fourteenth aspect, relating to the thirteenth aspect, the method further includes: detecting that a receipt item matches a transaction item, to identify a newly-matched R-T pairing; sending an alert to the user that notifies the user of the newly-matched R-T pairing; and providing a prompt to the user, via a user interface presentation, which invites the user to reject the newly-matched R-T pairing.

According to a fifteenth aspect, relating to the thirteenth aspect, the method further includes: detecting that a receipt item has not been matched with a transaction item within a prescribed amount of time since creation of the receipt item, that receipt item corresponding to an unmatched receipt item; sending an alert to the user that notifies the user of the unmatched receipt item; and providing a prompt to the user, via a user interface presentation, which invites the user to take an action with respect to the unmatched receipt item.

According to a sixteenth aspect, relating to the thirteenth aspect, the method further includes identifying one or more matching calendar entries in an electronic calendar associated with the user, each matching calendar entry having an event time that matches a transaction time of a transaction identified by the automation tool. The context information corresponds to calendar information provided by the matching calendar entries.

According to a seventeenth aspect, relating to the sixteenth aspect, the operation of using includes attaching a classification label to an R-T pairing associated with a matching calendar entry.

According to an eighteenth aspect, relating to the sixteenth aspect, the operation of using includes annotating an R-T pairing associated with a matching calendar entry with attendee information specified in the matching calendar entry.

According to a nineteenth aspect, relating to the thirteenth aspect, the method further includes presenting one or more user interface presentations on a display device, the user interface presentations including at least: one or more user interface presentations that enable the user to register a form of payment with the transaction-processing systems; one or more user interface presentations that enable the user to review and act on proposed R-T pairings; one or more user interface presentations that enable the user to enter instructions regarding unmatched receipt items; and one or more user interface presentations that enable the user to review the summary document.

According to a twentieth aspect, a computer-readable storage medium for storing computer-readable instructions is described. The computer-readable instructions, when executed by one or more hardware processors, perform a method by an automation tool that includes: receiving images from a digital camera; detecting a subset of the images that correspond to candidate receipts, each candidate receipt that is associated with a physical receipt containing image content that represents the physical receipt; converting, using optical character recognition, the image content in the candidate receipts into symbolic information, to provide recognized receipt items; storing the receipt items in a data store; receiving a stream of transaction items from one or more computer-implemented transaction-processing systems, each transaction item providing an electronic record of a transaction made by the user, as captured by a transaction-processing system and then forwarded to the automation tool via a computer network; storing the transaction items in a data store; identifying one or more matching receipt-transaction (R-T) pairings, each R-T pairing including a pairing of a receipt item and a transaction item that describe a same transaction made by the user, each R-T pairing also being linked to an image associated with its receipt item; and storing information regarding the one or more R-T pairings in a data store; identifying one or more matching calendar entries in an electronic calendar associated with the user, each matching calendar entry having an event time that matches a transaction time of a transaction identified by the automation tool; and using the matching calendar events to supplement the R-T pairings, to provide supplementation results. The operation of using includes: attaching a classification label to an R-T pairing associated with a matching calendar entry; and annotating the R-T pairing associated with the matching calendar entry with attendee information specified in the matching calendar entry. The method further includes generating a summary document that summarizes the transactions made by the user, the operation of generating being based at least on the supplementation results.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices that implement an automation tool for processing transactions made by a user, comprising:
hardware logic circuitry, the hardware logic circuitry including: (a) one or more hardware processors that perform operations by executing machine-readable instructions stored in a memory, and/or (b) one or more other hardware logic units that perform the operations using a task-specific collection of logic gates, the operations including:
receiving images from a digital camera;
detecting, using an image-classifying component implemented by the hardware logic circuitry, a subset of the images that correspond to candidate receipts, each candidate receipt that is associated with a physical receipt containing image content that represents the physical receipt;
converting, using an optical character recognition component implemented by the hardware logic circuitry, the image content in the candidate receipts into symbolic information, to provide recognized receipt items;
storing the receipt items in a data store;
receiving a stream of transaction items from one or more computer-implemented transaction-processing systems, each transaction item providing an electronic record of a transaction made by the user, as captured by a transaction-processing system and then forwarded to the automation tool via a computer network;
storing the transaction items in a data store;
identifying one or more matching receipt-transaction (R-T) pairings, each R-T pairing including a pairing of a receipt item and a transaction item that describe a same transaction made by the user, each R-T pairing also being linked to an image associated with its receipt item;
storing information regarding said one or more R-T pairings in a data store;
receiving calendar information from an electronic calendar associated with the user that describes a plurality of calendar entries, each calendar entry describing an event that has been scheduled, in advance of the event, for at least the user to participate in;
identifying one or more matching calendar entries in the electronic calendar, each matching calendar entry having an event time that matches a transaction time of a particular transaction identified by the automation tool;
using the matching calendar events to supplement the R-T pairings, to provide supplementation results;
generating a summary document that summarizes the transactions made by the user, said generating being based at least on the supplementation results; and
presenting one or more user interface presentations on a display device.

2. The one or more computing devices of claim 1, wherein the operations further comprise:
detecting that a particular receipt item matches a particular transaction item, to identify a newly-matched R-T pairing;
sending an alert to the user that notifies the user of the newly-matched R-T pairing; and
providing a prompt to the user, via a user interface presentation, which invites the user to reject the newly-matched R-T pairing.

3. The one or more computing devices of claim 1, wherein the operations further comprise:
detecting that a particular receipt item has not been matched with a particular transaction item within a prescribed amount of time since creation of the particular receipt item, the particular receipt item corresponding to an unmatched receipt item;
sending an alert to the user that notifies the user of the unmatched receipt item; and
providing a prompt to the user, via a user interface presentation, which invites the user to take an action with respect to the unmatched receipt item.

4. The one or more computing devices of claim 3, wherein the prompt invites the user to instruct the automation tool to continue to try to match the unmatched receipt item with newly-received transaction items.

5. The one or more computing devices of claim 3, wherein the prompt invites the user to instruct the automation tool to cease attempting to match the unmatched receipt item with newly-received transaction items.

6. The one or more computing devices of claim 3, wherein the prompt invites the user to use the automation tool to create a matching transaction item for the unmatched receipt item, rather than waiting for a new transaction item to arrive from said one or more transaction-processing systems that matches the unmatched receipt item.

7. The one or more computing devices of claim 6, wherein the operations further include creating a matching transaction item based, at least in part, on information contained in the unmatched receipt item.

8. The one or more computing devices of claim 6, wherein the matching transaction item is created by the user based on metadata extracted from the unmatched receipt item and/or based on manually input metadata specified by the user.

9. The one or more computing devices of claim 1, wherein said using comprises:
classifying a particular R-T pairing based on a particular matching calendar entry; and
attaching a classification label to the particular R-T pairing associated with the particular matching calendar entry.

10. The one or more computing devices of claim 9, wherein one kind of classification label specifies that the particular R-T pairing associated with the particular matching calendar entry describes a business expense.

11. The one or more computing devices of claim 1, wherein said using comprises annotating a particular R-T pairing associated with a particular matching calendar entry with attendee information specified in the particular matching calendar entry, the attendee information identifying a person other than the user who is also scheduled to participate in a particular event to which the particular matching calendar entry pertains.

12. The one or more computing devices of claim 1, wherein a particular calendar entry specifies a span of time, and wherein said identifying one or more matching calendar entries includes, for a particular R-T pairing, determining whether a particular event time associated with the particular R-T pairing occurs within the span of time associated with the particular calendar entry.

13. The one or more computing devices of claim 1, wherein a particular calendar entry is created in the electronic calendar for a particular event in response to an electronic invitation sent to one or more invited attendees of the particular event.

14. The one or more computing devices of claim 1,
wherein the operations further include presenting one or more graphical cards to the user pertaining to one or more respective R-T pairings,
each graphical card associated with a particular R-T pairing including one or more graphical controls that invite the user to take plural respective actions with respect to the particular R-T pairing.

15. The one or more computing devices of claim 14, wherein the plural respective actions include: rejecting the particular R-T pairing, accessing additional information regarding the particular R-T pairing, and manually supplementing the particular R-T pairing with additional information.

16. A method for processing transactions made by a user using a computer-implemented automation tool, comprising:
receiving images from a digital camera;
detecting, using an image-classifying component implemented by the automation tool, a subset of the images that correspond to candidate receipts, each candidate receipt that is associated with a physical receipt containing image content that represents the physical receipt;
converting, using an optical character recognition component implemented by the automation tool, the image content in the candidate receipts into symbolic information, to provide recognized receipt items;
storing the receipt items in a data store;
receiving a stream of transaction items from one or more computer-implemented transaction-processing systems, each transaction item providing an electronic record of a transaction made by the user, as captured by a transaction-processing system and then forwarded to the automation tool via a computer network;
storing the transaction items in a data store;
identifying one or more matching receipt-transaction (R-T) pairings, each R-T pairing including a pairing of a receipt item and a transaction item that describe a same transaction made by the user, each R-T pairing also being linked to an image associated with its receipt item;
storing information regarding said one or more R-T pairings in a data store;
receiving calendar information from an electronic calendar associated with the user that describes a plurality of calendar entries, each calendar entry describing an event that has been scheduled, in advance of the event, for at least the user to participate in;
identifying one or more matching calendar entries in the electronic calendar, each matching calendar entry having an event time that matches a transaction time of tho a transaction identified by the automation tool;
using the matching calendar events to supplement the R-T pairings, to provide supplementation results; and
generating a summary document that summarizes the transactions made by the user, said generating being based at least on the supplementation results.

17. The method claim 16, further comprising:
detecting that a particular receipt item matches a transaction item, to identify a newly-matched R-T pairing;
sending an alert to the user that notifies the user of the newly-matched R-T pairing; and
providing a prompt to the user, via a user interface presentation, which invites the user to reject the newly-matched R-T pairing.

18. The method of claim 16, wherein the method further comprises:
detecting that a particular receipt item has not been matched with a transaction item within a prescribed amount of time since creation of the receipt item, the particular receipt item corresponding to an unmatched receipt item;
sending an alert to the user that notifies the user of the unmatched receipt item; and
providing a prompt to the user, via a user interface presentation, which invites the user to take an action with respect to the unmatched receipt item.

19. The method of claim 16, wherein said using comprises:
classifying a particular R-T pairing based on a particular matching calendar entry; and
attaching a classification label to the particular R-T pairing associated with the particular matching calendar entry.

20. The method of claim 16, wherein said using comprises annotating a particular R-T pairing associated with a particular matching calendar entry with attendee information specified in the particular matching calendar entry, the attendee information identifying a person other than the user who is also scheduled to participate in a particular event to which the particular matching calendar entry pertains.

21. A computer-readable storage medium for storing computer-readable instructions, the computer-readable instructions, when executed by one or more hardware processors, performing a method by an automation tool that comprises:

receiving images from a digital camera;
detecting a subset of the images that correspond to candidate receipts, each candidate receipt that is associated with a physical receipt containing image content that represents the physical receipt;
converting, using optical character recognition, the image content in the candidate receipts into symbolic information, to provide recognized receipt items;
storing the receipt items in a data store;
receiving a stream of transaction items from one or more computer-implemented transaction-processing systems, each transaction item providing an electronic record of a transaction made by the user, as captured by a transaction-processing system and then forwarded to the automation tool via a computer network;
storing the transaction items in a data store;
identifying one or more matching receipt-transaction (R-T) pairings, each R-T pairing including a pairing of a receipt item and a transaction item that describe a same transaction made by the user, each R-T pairing also being linked to an image associated with its receipt item;
storing information regarding said one or more R-T pairings in a data store;
receiving calendar information from an electronic calendar associated with the user that describes a plurality of calendar entries, each calendar entry describing an event that has been scheduled, in advance of the event, for at least the user to participate in;
identifying one or more matching calendar entries in the electronic calendar, each matching calendar entry having an event time that matches a transaction time of tho a transaction identified by the automation tool;
using the matching calendar events to supplement the R-T pairings, to provide supplementation results,
said using including:
classifying a particular R-T pairing based on a particular matching calendar entry; and
attaching a classification label to the particular R-T pairing associated with the particular matching calendar entry; and
annotating the particular R-T pairing associated with the particular matching calendar entry with attendee information specified in the particular matching calendar entry, the attendee information identifying a person other than the user who is also scheduled to participate in a particular event to which the particular matching calendar entry pertains; and
generating a summary document that summarizes the transactions made by the user, said generating being based at least on the supplementation results.

* * * * *